US007561935B2

(12) United States Patent
Chung

(10) Patent No.: US 7,561,935 B2
(45) Date of Patent: Jul. 14, 2009

(54) INTEGRATED MULTIMEDIA SIGNAL PROCESSING SYSTEM USING CENTRALIZED PROCESSING OF SIGNALS

(75) Inventor: Chul Chung, Pleasanton, CA (US)

(73) Assignee: Mondo System, Inc., Seoul (KR)

( * ) Notice: Subject to any disclaimer, the term of this patent is extended or adjusted under 35 U.S.C. 154(b) by 180 days.

(21) Appl. No.: 11/384,337

(22) Filed: Mar. 21, 2006

(65) Prior Publication Data

US 2006/0161282 A1 Jul. 20, 2006

Related U.S. Application Data

(62) Division of application No. 11/204,375, filed on Aug. 16, 2005.

(60) Provisional application No. 60/640,085, filed on Dec. 30, 2004.

(51) Int. Cl.
*G06F 17/00* (2006.01)

(52) U.S. Cl. ........................................ 700/94; 381/103

(58) Field of Classification Search ....................... None
See application file for complete search history.

(56) References Cited

U.S. PATENT DOCUMENTS

| | | | |
|---|---|---|---|
| 3,582,964 | A | 6/1971 | Torick et al. |
| 4,251,688 | A | 2/1981 | Furner |
| 4,387,270 | A | 6/1983 | Sakano et al. |
| 4,406,923 | A | 9/1983 | Burne et al. |
| 4,503,553 | A | 3/1985 | Davis |
| 4,675,835 | A | 6/1987 | Pfleiderer |
| 4,905,284 | A | 2/1990 | Kwang |
| 5,018,205 | A | 5/1991 | Takagi et al. |
| 5,255,326 | A | 10/1993 | Stevenson |
| 5,406,634 | A | 4/1995 | Anderson et al. |
| 5,615,270 | A | 3/1997 | Miller et al. |

(Continued)

FOREIGN PATENT DOCUMENTS

| | | |
|---|---|---|
| JP | 2002-84154 | 3/2002 |

(Continued)

OTHER PUBLICATIONS

Office Action dated Aug. 4, 2008 from copending U.S. Appl. No. 11/384,442.

(Continued)

*Primary Examiner*—Walter F Briney, III
(74) *Attorney, Agent, or Firm*—H.C. Park & Associates, PLC

(57) ABSTRACT

Integrated processing of multimedia signals can eliminate unnecessary signal processors and converters without losing the functionality of typical home entertainment system components. The integrated multimedia system includes a main player that captures and processes signals digitally. The main player may adjust the audio signal to provide audio output of equal loudness across all frequencies by accounting for sensitivity of the human ear for sounds of varying frequencies. The main player can also account for perceived differences in loudness based on the angle of a listener to a speaker by detecting the position of a user and making an adjustment accordingly. The invention further provides a speaker that has embedded performance characteristics or an identifier that allows the system to provide an optimal speaker driving current for a particular system or determine how that speaker would be best implemented in the integrated system.

6 Claims, 20 Drawing Sheets

U.S. PATENT DOCUMENTS

| | | | | |
|---|---|---|---|---|
| 5,814,752 | A | 9/1998 | Rivera | |
| 5,907,622 | A | 5/1999 | Dougherty | |
| 6,201,873 | B1 | 3/2001 | Dal Farra | |
| 6,236,731 | B1 | 5/2001 | Brennan et al. | |
| 6,385,322 | B1 | 5/2002 | Mietling | |
| 6,442,277 | B1 | 8/2002 | Lueck et al. | |
| 6,574,339 | B1 * | 6/2003 | Kim et al. | 381/17 |
| 6,738,318 | B1 | 5/2004 | Harris | |
| 6,741,273 | B1 | 5/2004 | Waters et al. | |
| 6,859,538 | B1 | 2/2005 | Voltz | |
| 6,931,135 | B1 | 8/2005 | Kohut | |
| 6,999,826 | B1 | 2/2006 | Zhou et al. | |
| 2002/0072816 | A1 | 6/2002 | Shdema | |
| 2002/0159611 | A1 | 10/2002 | Cromer et al. | |
| 2003/0031333 | A1 * | 2/2003 | Cohen et al. | 381/303 |
| 2003/0198339 | A1 | 10/2003 | Roy et al. | |
| 2004/0119889 | A1 | 6/2004 | Ogata | |
| 2004/0228498 | A1 | 11/2004 | Sekine | |
| 2004/0240684 | A1 | 12/2004 | Cerasuolo et al. | |
| 2005/0013443 | A1 | 1/2005 | Marumoto et al. | |
| 2005/0074135 | A1 | 4/2005 | Kushibe | |
| 2005/0131558 | A1 | 6/2005 | Braithwaite | |
| 2005/0283264 | A1 | 12/2005 | du Breuil | |
| 2006/0020354 | A1 | 1/2006 | Lorkovic | |
| 2006/0140418 | A1 | 6/2006 | Koh et al. | |

FOREIGN PATENT DOCUMENTS

| | | |
|---|---|---|
| WO | 02-41664 | 5/2002 |

OTHER PUBLICATIONS

Reams, System and Method for Processing Audio Data, WO 02/21505 A2; Mar. 14, 2002.

* cited by examiner

● Legacy Audio system

Problems
-Quality degradation (many of analog connections)
-High cost (many of precise analog parts with its own PS)
-No upgradeable (All dedicated solution)

● New proposed Crossover unit implementation

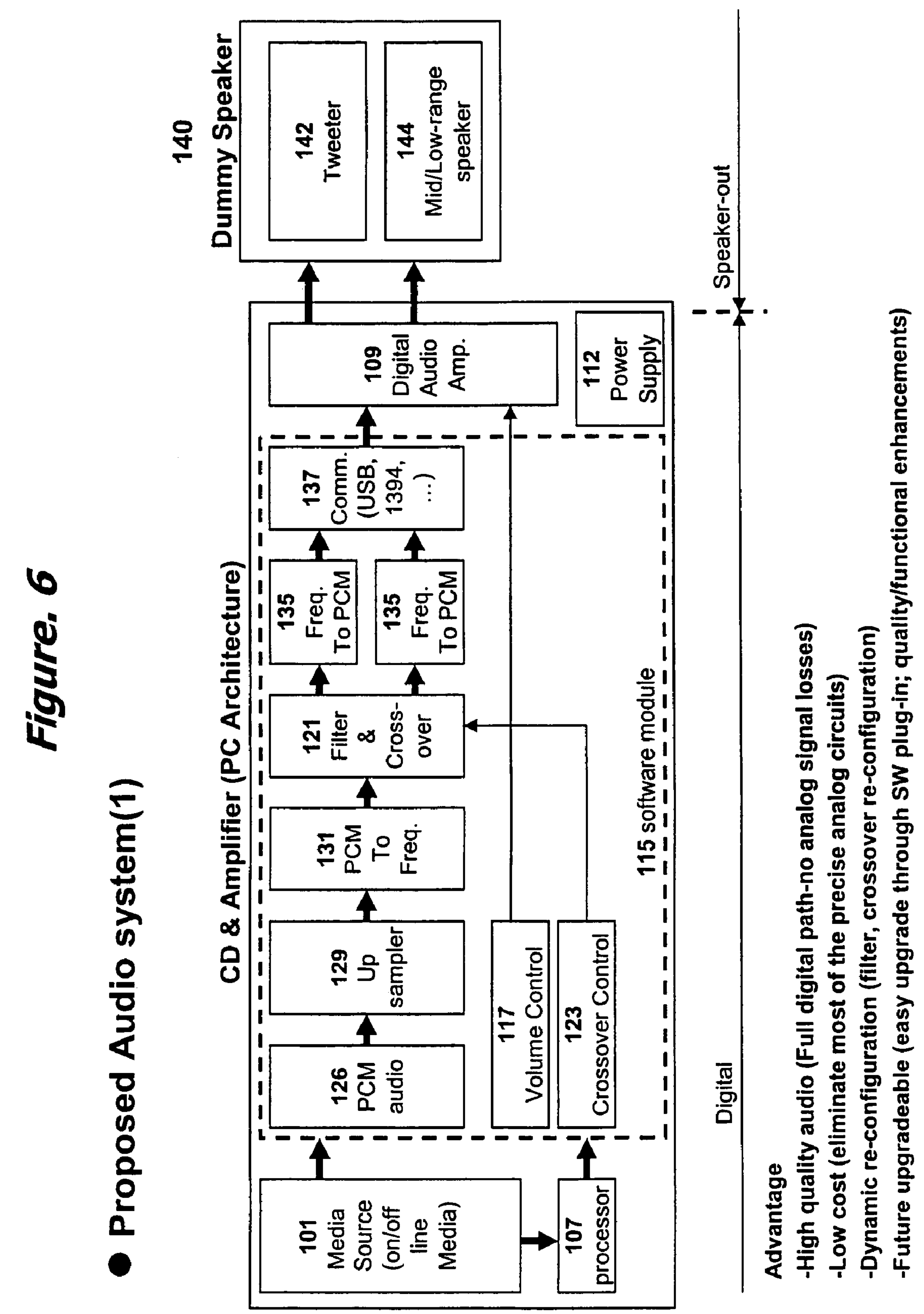
Figure. 6
● Proposed Audio system(1)
CD & Amplifier (PC Architecture)
101 Media Source (on/off line Media)
107 processor
126 PCM audio
129 Up sampler
131 PCM To Freq.
121 Filter & Cross-over
135 Freq. To PCM
135 Freq. To PCM
137 Comm. (USB, 1394, ...)
117 Volume Control
123 Crossover Control
115 software module
109 Digital Audio Amp.
112 Power Supply
140 Dummy Speaker
142 Tweeter
144 Mid/Low-range speaker
Digital
Speaker-out
Advantage
-High quality audio (Full digital path-no analog signal losses)
-Low cost (eliminate most of the precise analog circuits)
-Dynamic re-configuration (filter, crossover re-configuration)
-Future upgradeable (easy upgrade through SW plug-in; quality/functional enhancements)

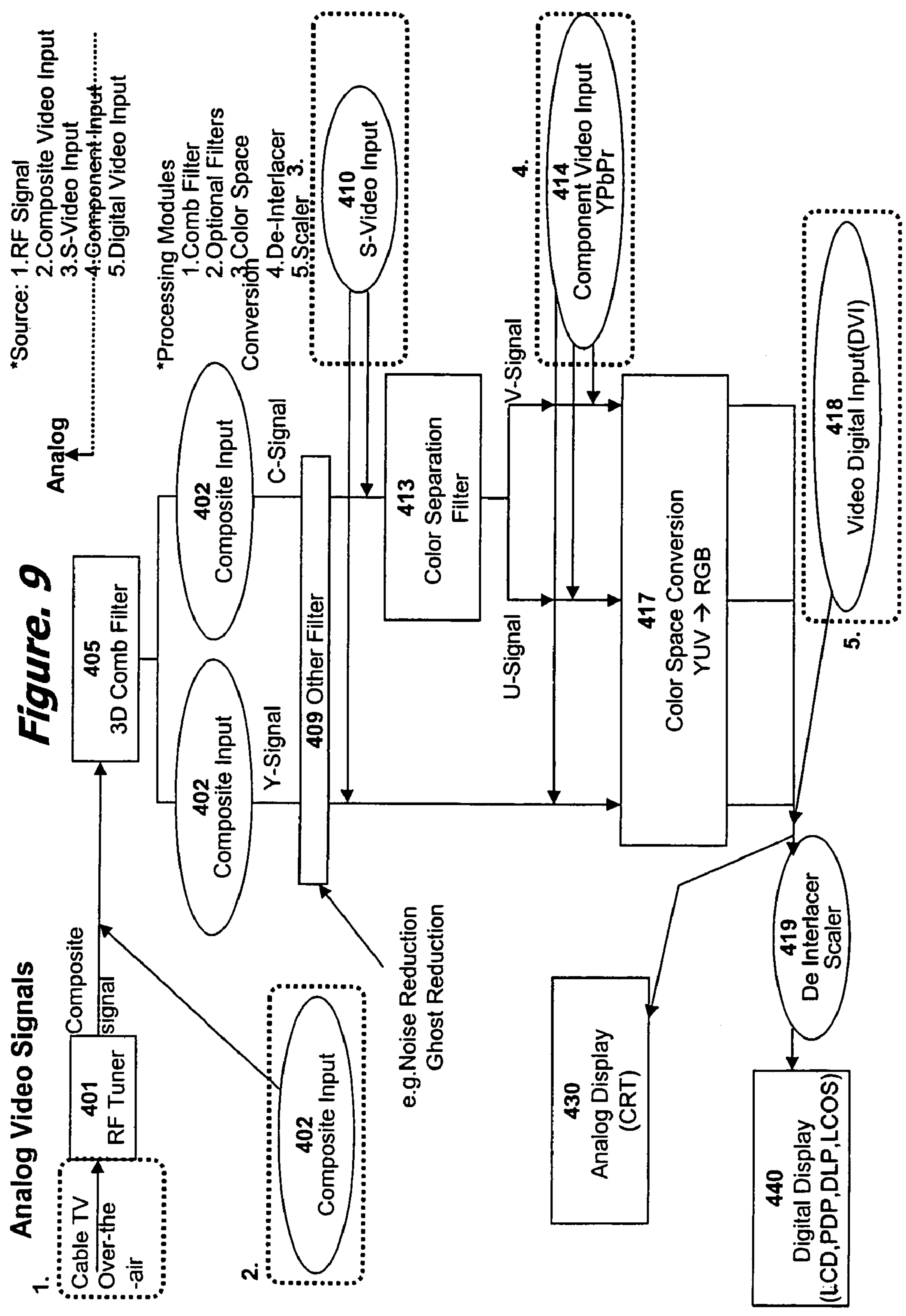
Figure. 9
Analog Video Signals
1.
Cable TV
Over-the
-air
401
RF Tuner
Composite
signal
2.
402
Composite Input
405
3D Comb Filter
402
Composite Input
402
Composite Input
Y-Signal
C-Signal
409 Other Filter
e.g.Noise Reduction
Ghost Reduction
413
Color Separation
Filter
U-Signal
V-Signal
410
S-Video Input
3.
414
Component Video Input
YPbPr
4.
417
Color Space Conversion
YUV → RGB
418
Video Digital Input(DVI)
5.
419
De Interlacer
Scaler
430
Analog Display
(CRT)
440
Digital Display
(LCD,PDP,DLP,LCOS)
Analog
*Source: 1.RF Signal
2.Composite Video Input
3.S-Video Input
4.Component Input
5.Digital Video Input
*Processing Modules
1.Comb Filter
2.Optional Filters
3.Color Space
Conversion
4.De-Interlacer
5.Scaler

- Legacy DVD Playback system

Problems

-Quality degradation (Excessive scaling and Digital-to-analog conversions)

-High cost (extra parts used)

-Limited quality & function upgrade (dedicated solutions are being used)

● Proposed DVD/Video Playback system

Advantage
-High quality audio (Full digital path, with only one scaling)
-Low cost Display (simple LCD/PDP panel with only display driver part)
-Future upgradeable (easy upgrade through SW plug-in; quality/functional enhancements)

● Proposed Media DB system

Figure. 16

Normal equal-loudness-level contours for pure tones under free-field listening conditions

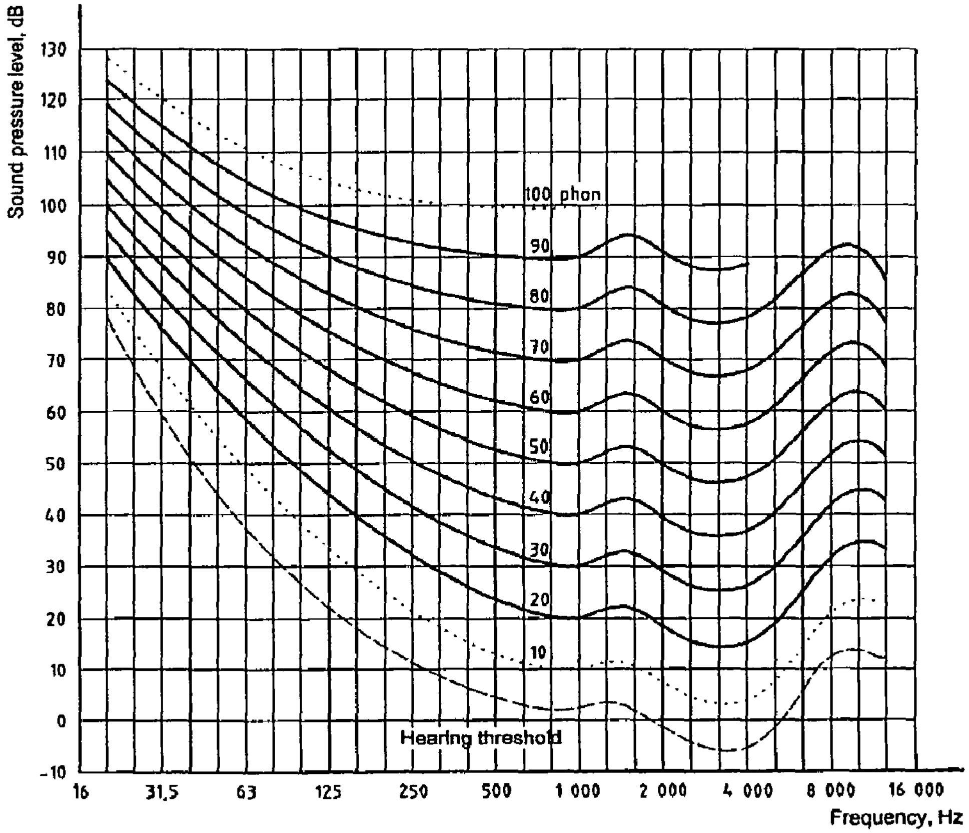

NOTE 1 The hearing threshold under free-field listening condition, $T_f$, is indicated by a dashed line.

NOTE 2 The contour at 10 phon is drawn by dotted lines because of the lack of experimental data between 20 phon and the hearing thresholds. Moreover, the 100-phon contour is also described by a dotted line because data from only one institute are available at this loudness level.

INTEGRATED MULTIMEDIA SIGNAL PROCESSING SYSTEM USING CENTRALIZED PROCESSING OF SIGNALS

CROSS-REFERENCE TO RELATED APPLICATION

This application is a divisional of prior application Ser. No. 11/204,375, filed Aug. 16, 2005, which claims the benefit of U.S. Provisional Patent Application No. 60/640,085, filed Dec. 30, 2004, with the U.S. Patent and Trademark Office, both of which are incorporated by reference in their entirety.

FIELD OF THE INVENTION

Traditionally, audio and video components have been developed separately. To ensure compatibility with other components made by different manufacturers, the industry has developed interfaces that can accommodate a wide range of products. This provides a limited number of interfaces between each component because a greater emphasis is placed on compatibility rather than quality. Therefore, each component has to output signals that are compatible with these standardized interfaces. This may cause significant loss and distortion of signals between the components because of the measures taken to make components communicate with each other. Also, each component currently has a separate control device for its operation, even though they operate integrally. So the invention discloses an embodiment that provides an integrated control of all the audio/video and other entertainment operations, using a centralized processing scheme, preferably in a single box or housing.

BACKGROUND OF THE INVENTION

Currently, an integrated audio/video entertainment system, called a home entertainment system, is available. Each entertainment system requires at least three different components, which may include: a television (TV) or a video display; a video tape recorder (VTR) or digital versatile disk (DVD) player that mainly provides video signals to the display; but also provides an audio component. A home entertainment system may additionally include a set top box, which receives audio/video signals from, for example, an antenna, a cable, or a satellite dish, and a digital video recorder (DVR) that is either a separate component or integrated in the set top box.

Generally, consumers purchase these three or four components from more than one manufacturer. Even from the same manufacturer, each component may be bought separately and come in a separate box with independent functions. These components normally are made as separate independent devices because it is not known what other different components consumers may connect together to form a home entertainment system. For example, TV manufacturers make a TV as an independent, separate, stand-alone device, so that any kind of video source, whether it is a VTR, a DVD player, or a set top box, can be connected to the TV. This gives consumers a choice. Thus, TV manufacturers have to provide as many connection ports and interfaces as economically feasible. These standards are set by industry organizations, such as the International Organization for Standardization (ISO), the Institute of Electrical and Electronics Engineers (IEEE), and the National Television System Committee (NTSC).

One problem, however, is that TV manufacturers have to provide their TVs at least one or two, if not all, of these interface terminals, plus any required interface converters.

Video source equipment manufacturers also have to provide many different types of interface terminals because they do not know which type of display device may be connected to their products, and they want to give consumers as many choices as possible. As a result, devices like VTRs and DVD players also have three or four different kinds of terminals or interfaces. Alternatively, manufacturers may only provide one kind of interface that provides widespread compatibility but sacrifices quality in doing so.

Audio source equipment and set top box manufacturers are no exceptions, either. So if we look at these three or four different components making up a home entertainment system, each component is providing three or four different interfaces just in order to provide compatibility among the consumers' choice of equipment.

Because most of the interfaces were set up with the existing components in mind, the internal, or source, signals may have to be converted to output signals solely for the purpose of communicating between components even though these different components use similar internal signals for their internal processes. For example, component A and component B process signals in the same format internally, but these internal signals may have to be converted simply for transmitting signals between component A and component B.

In order to make different kinds of output signals available, every component needs to convert signals from the format, in which it is originally processed, to another format for transmitting output signals. Such a conversion may cause signal loss or distortion.

Many products like a receiver/boom box, such a mini stereo system, or home theater in a box (HTIB) have been introduced to the market. However, these products are nothing but a simple physical integration of each component and do not provide any functional integration.

SUMMARY OF THE INVENTION

The present invention addresses these problems by providing a system that centrally processes audio/video and other information signals. This may eliminate unnecessary conversion of signals for communication between components, thereby preserving the characteristics of the original source signals and reproducing the purest possible source signals for delivery to end users, listeners or viewers via an output device, such as a display, speakers, or other sound reproduction systems.

The present invention may also enable to eliminate duplicative installation of conversion mechanisms for generating and receiving output signals currently present in most home electronics components. Therefore, a manufacturer may provide its products either at a lower price or equipped with better devices or components at the substantially same price.

The present invention may offer better performance when the source signals are all digitally coded and the output device is digitally operated.

The present invention provides a cost effective high end audio video reproduction system by centrally processing the functions that are now performed separately in each of the components. The present invention also enables the user to easily generate supplemental information on the musical and video contents and to broadly share such information to enhance the enjoyment of viewing and listening experience.

The present invention can be achieved by functional decomposition of the existing components and combining those functions to be processed centrally, thus minimizing digital to analog or analog to digital conversions by processing all the signals digitally.

Human beings do not respond uniformly to the entire range of frequencies across the audible spectrum of sound. For example, human ears can sense small changes in sound level at a middle range of frequencies of the audible spectrum more easily than changes in sound level at a low range of frequencies. Therefore, a uniform increase in sound level, which may be measured in decibels, will not uniformly increase the loudness, as perceived by a listener, for sounds of varying frequencies that comprise audio output. This uneven distribution of loudness in audio output may distort the listening experience.

To resolve this problem, the invention may separate the sounds comprising audio output by frequency range and adjust the optimal sound level for each frequency range according to human response characteristics for sound or a listener's preferences, and then use these adjustments for generating adjusted signals for driving amplifiers.

The invention provides an integrated audio processing system, comprising: an audio source; a central processing unit responsive to an audio signal from the audio source; and a digital volume control module adjusting the audio signal to provide an equal-loudness level for all audio frequencies of the audio signal.

The invention further provides an integrated audio processing system that includes an audio source; a central processing unit responsive to an audio signal from the audio source; a digital volume control module adjusting the audio signal; an input device providing information regarding a listener's position to the digital volume control module; and a plurality of speakers outputting audio based on the processed audio signal. The digital volume control module may also adjust the audio signal in response to the listener position information.

The invention also provides an integrated audio processing system that includes an audio source; a central processing unit responsive to an audio signal from the audio source; and a speaker coupled with the central processing unit. The speaker transmits a performance characteristic to the central processing unit, which is used by the central processing unit in processing the audio signal.

BRIEF DESCRIPTION OF THE DRAWINGS

FIG. 6 shows a schematic block diagram for an audio reproduction system according to an embodiment of the present invention.

FIG. 9 shows a schematic block diagram for a typical TV set.

FIG. 16 is a graph showing human hearing threshold loudness levels at different sound pressure levels across the audible spectrum of sound.

DETAILED DESCRIPTION OF THE INVENTION

In addressing the problem as described above, the present invention discloses a system and method that may eliminate digital-analog conversions that are essential for interface compatibility among typical home electronic products. The present invention takes the most advantage of audio and video signals recorded in a digital format. However, the present invention is not limited thereto, and can be used with traditional analog audio/video sources.

Figure 1:
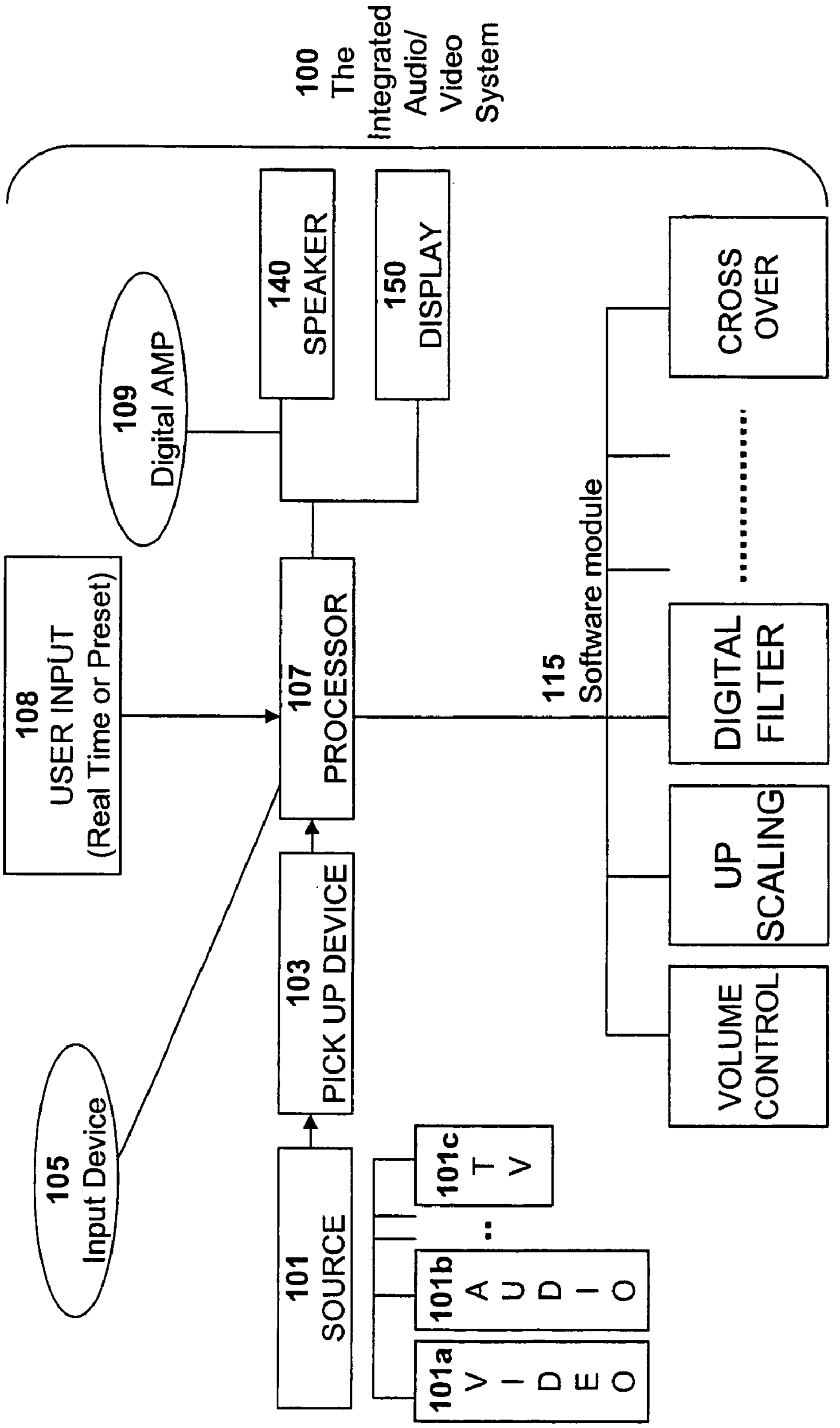
FIG. 1 shows a schematic block diagram for an integrated multimedia system according to an embodiment of the present invention.

FIG. 1 shows a schematic diagram for an embodiment of the present invention. The integrated audio/video system 100 includes a main processor 107 that receives an input signal from a signal pick-up device 103, which acquires a source signal from a source 101 such as, for example, a video source 101*a*, an audio source 101*b*, or a TV tuner 101*c*. The input signal is preferably a digital signal, but could be any type of audio/video signal, like an analog signal from a phonograph.

The processor processes the input signal according to a user input 108. The user input can be real time, such as adjusting volume or tone, or pre-set parameters. These pre-set parameters can be stored by the user on the system, or they can be generated by the system based on the system's analysis of the user's preferences based on the media viewed or listened to.

The output signals from processor 107 are also preferably digital signals. In an embodiment of the present invention, the signals are processed mostly by software but the present invention is not so limited. If necessary, a peripheral device, such as a specialty chip or graphic chip, can be used to process signals from the source for a specific purpose like upsampling data from an audio source or acting as a digital filter for video signals. In that case, the main processor 107 still communicates with the peripheral devices via digital signals.

The output signals from the main processor go to the output devices. For example, video signals are directly sent to video display 150. Modem video displays like a Liquid Crystal Display (LCD), a Plasma Display Panel (PDP), or a Digital Light Processing™ (DLP) projector can take full advantage of the digital signal output from the main processor.

Audio signals may pass through an amplifier 109, which is preferably digital, in order to generate currents that can drive speakers. A speaker that can be driven by the digital signal instead of currents, however, may eliminate the need for a digital amplifier.

Figure 2:
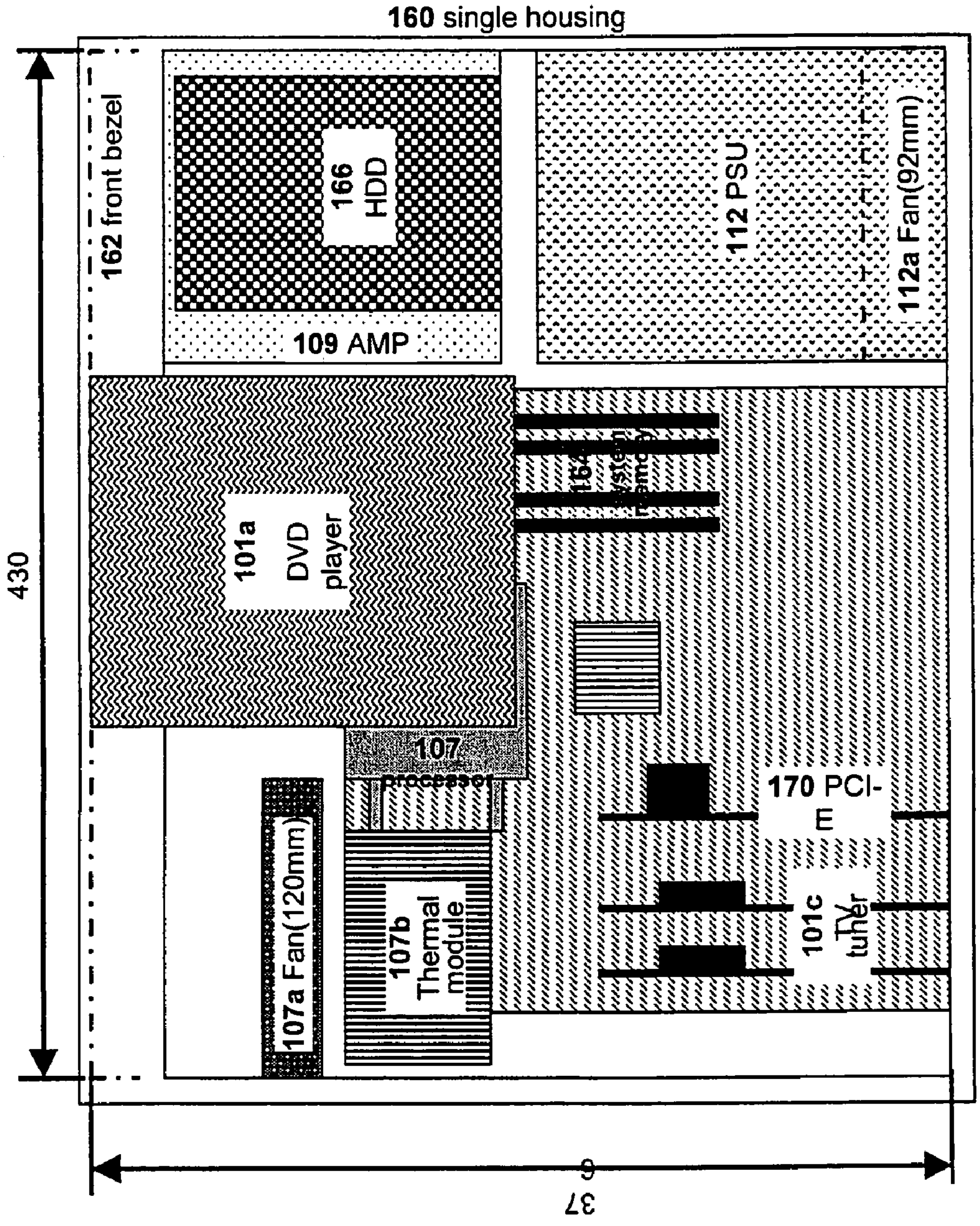
FIG. 2 shows a layout of an embodiment of the present invention in a PC architecture.

An embodiment of the present invention may use a personal computer (PC) architecture, as shown in FIG. 2, and use a general purpose central processing unit (CPU), such as an Intel Pentium® 4 and its peripheral devices that can run widely available operating systems like, for example, Microsoft Windows® or Linux. Processing of audio and video signals may be performed in conjunction with software or peripheral hardware devices. The system can also include storage like, for example, random access memory (RAM) or a hard disk drive. However, the present invention is not limited thereto, and other processors, architectures, or operating systems may be used. Further, the present invention creates a need to develop a new operating system for controlling a home entertainment system and providing other features such as Internet access, word processing, as well as other office or work-related applications.

An embodiment of the present invention uses a DVD drive 101*a* commonly used in most PCs for a source, or any type of optical memory drive device or optical media device, but the source could be an analog VCR source, a TV tuner, an FM/AM radio tuner, a USB port, an Internet connection, cable, satellite broadcast, digital mobile broadcast (DMB), or other sources known by those having skill in the art. As shown in FIG. 2, the DVD drive may be included in the same housing as the processor as known in a typical PC architecture. Also, an amplifier for driving a speaker system (more than one speaker unit) may be included in the same housing. Furthermore, there may be a plurality of amplifiers. The amplifiers may be analog and/or digital. According to one embodiment of the present invention, there may be at least one analog amplifier among this plurality of amplifiers.

An embodiment of the present invention may include an LCD, PDP, or DLP™ projector as the display device 150, any other display device that can operate in a digital mode may also be suitable. However, under certain circumstances, analog display devices may also be used.

Now each component of the present invention will be described.

Figure 3:
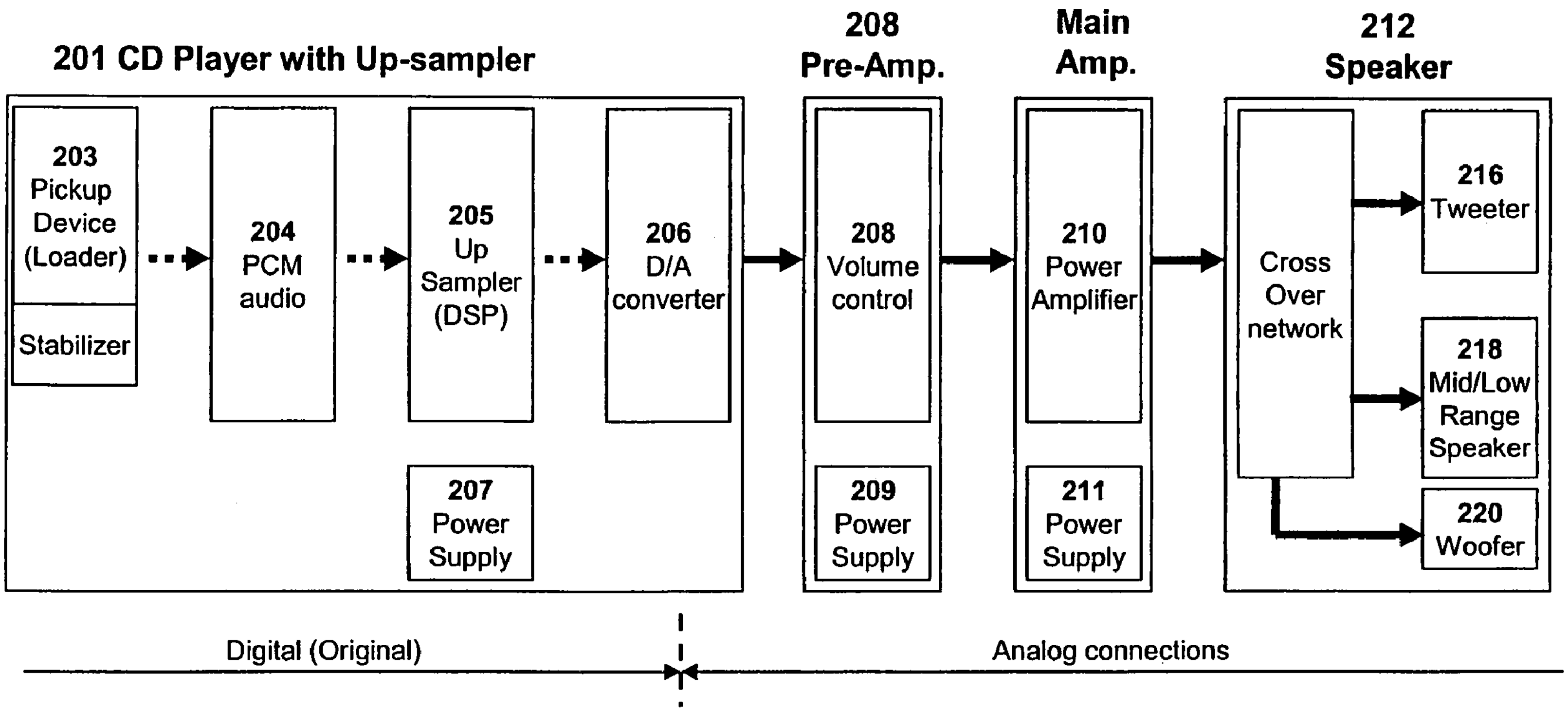
FIG. 3 shows a schematic block diagram for a typical audio reproduction system.

FIG. 3 is a schematic diagram of a known audio reproduction systems. A source player picks up a source signal from various sources. For illustration, the most commonly used music source today, a compact disc (CD) player 201 will be used as the source.

In a CD player, a laser pick-up device 203 reads music signals decoded on CD 201. The signal read by laser pick-up device 203 is a digital code, which is a combination of zeroes and ones, and the digital code is decoded by a pulse code modulator (PCM) 204, which is a digital representation of analog data. The digital code is converted into analog signals by a processor 206 that is embedded into the player or may be separately packaged. A pre-amplifier 208 receives the analog signals and may manipulate them by adjusting their volume and tone. Signals can be manipulated either in an analog or digital format. A power amplifier 210 receives output from pre-amplifier 208 and generates currents that can drive speakers 212. Speakers 212 receive the outputs from power amplifier 210 and divide the signals using internal crossover logic. Each of the CD player 201, pre-amplifier 208, and power amplifier 210 includes a respective separate power source 207, 209, 211. In a 3-way speaker system, crossover network 214 divides the signal into a high frequency range, a mid frequency range, and a low frequency range. The high frequency range signal drives a tweeter 216, the mid frequency range signal drives a mid-range unit 218, and the low frequency range signal drives a bass unit 220.

An upsampler 205 may be added between source player/data pick-up device 203 and processor 206. Upsampler 205 increases the sampling rate of conventional CD's 44.1 KHz up to 98 KHz or higher. Upsampling provides much better quality of audio sound reproduction.

The above-described audio reproduction system converts an original audio digital signal into an analog signal for further processing. However, digital processing provides more precise control of sounds and better noise reduction. Therefore, higher end audio equipment typically manipulates such signals digitally and in that case, the analog signals converted from the digital source code are converted into a digital format again. Additional signal conversion may also be necessary in the power amplifier as well as in the pre-amplifier. The repeated conversions of signals from analog to digital and digital to analog may cause data loss or distortion.

The present invention may solve these problems by taking the digital signals read by the laser pick-up device and having the necessary signal manipulation performed by one powerful main processor that generates speaker driving signals for a power amplifier. In one embodiment, the power amplifier may be a digital amplifier, an analog amplifier, or a combination of both.

Figure 4:
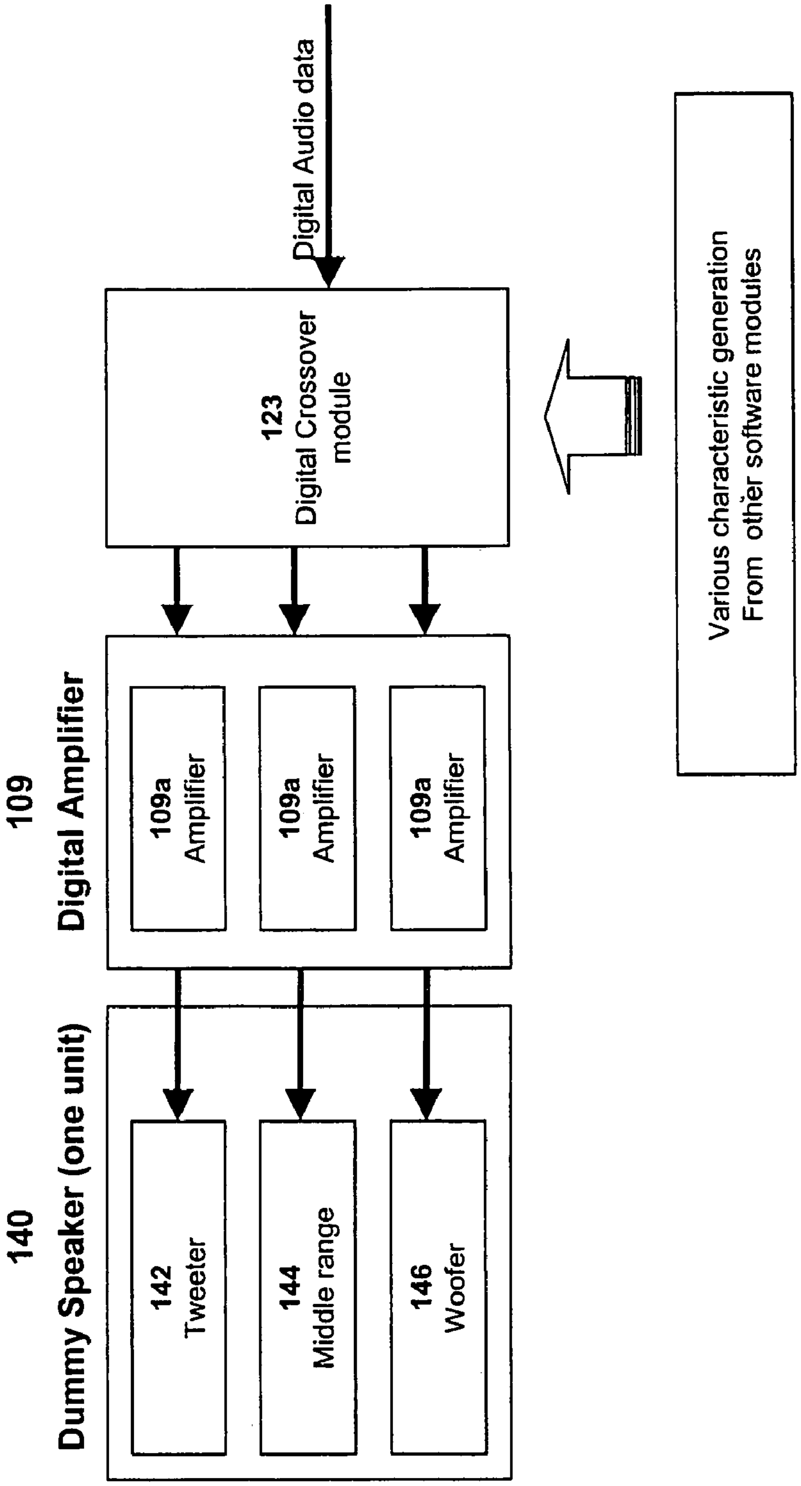
FIG. 4 shows a schematic block diagram for a digital crossover system according to an embodiment of the present invention.

Referring to FIG. 4, integrated audio/video system 100 may include a digital crossover 123, which can be implemented as a software module 115. Using the crossover module, main processor 107 can divide the processed audio signal into signals of speaker driving different frequency ranges and directly send the divided speaker driving signals to respective digital amplifier units 109*a* of amplifier 109, which in turn drives a speaker unit 142, 144, 146 of dummy speaker 140 corresponding to the frequency range of the supplied speaker driving signal. Digital amplifier 109 may use pulse width modulation (PWM), for example, to generate the appropriate current for driving the speakers.

Moreover, amplifier 109 may be a hybrid amplifier that includes an analog amplifier unit and a digital amplifier unit. Analog amplifiers may be more suitable for driving high frequency speaker units such as tweeter 142, while digital amplifiers may be more suitable for driving high power low frequency speaker units such as woofer 146.

High quality audio with precise crossover point control can be easily obtained by using digital crossover. Each digital driving current provides a speaker driving current from a respective speaker driving signal from the digital crossover module. Because the crossover may be digitally controlled by a software module, the various signal characteristics can be dynamically reconfigured.

Furthermore, centrally processing the digital audio signals using a main processor enables the implementation of digital volume control, upsampling, and digital filtering, for example, by simply adding a software module. These processing functions can also be achieved using peripheral hardware capable of digital signal manipulation that is coupled to the main processor.

Digital filtering can emulate the acoustical characteristics of the outputted audio to meet an individual listener's musical tastes, such as reproducing the characteristic of audio coming from a tube amplifier or a phonograph. Software based crossover logic may provide more precise control of frequency crossover at a much lower cost. It also can provide dynamic configuration of the crossover frequencies, which together with the modules controlling other acoustical characteristics, provide optimal control of audio output.

The present invention may use a PC architecture as shown in FIG. 2. A new scheme of using a digital power amplifier has been developed so that it can be used under the existing PC architecture. Thus, a single housing 160 having a typical front bezel 162 may have disposed therein: a source such as a DVD player 101*a*, a processor 107 having cooling elements like a fan 107*a* and a thermal module 107*b*, a system memory 164, a hard disk drive 166 or other mass storage device, a power supply 112 and cooling fan 112*a*, and expansion slots 170. Other hardware and software can be incorporated into the PC architecture such as, for example, a TV-Tuner 101*c*, an amplifier 109 digital and/or analog, a digital video output card, and a variety of PC interfaces like universal serial bus (USB), Firewire (IEEE 1394), a network interface card, a variety of software control modules 115, and a typical PC operating system like Windows®, Linux or Mac OS®, just to name a few.

Figure 5:
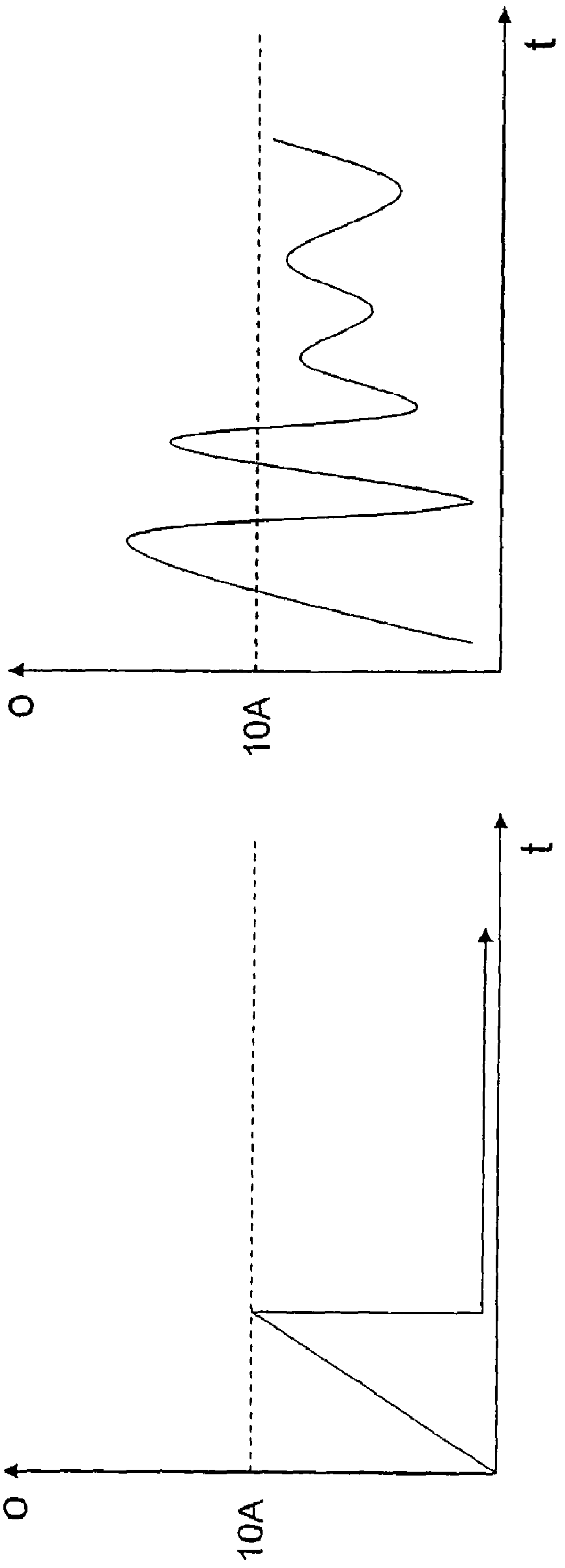
FIG. 5 shows PC switching power characteristics and an exemplary power consumption wave for sound reproduction.

Looking at FIG. 5, however, a PC will normally shut down if it experiences a certain current power threshold level, which is shown as 10 A here. However, a typical home entertainment system may briefly experience current levels in excess of a PC's threshold when the amplifier generates high powered driving current, like those for certain high power bass frequencies. Accordingly, a system according to the present invention must be able to exceed a PC current threshold level when a PC architecture is used to implement an integrated multimedia processing system. Therefore, the system may provide a power tank coupled to power unit 112 to manage the spikes in current to prevent system shutdown when high powered signals are required to be driven.

Looking at FIG. 1, signal pick-up device 103 picks up a signal from source 101. Once the signal is picked up, the signals are computed or manipulated through processor 107, and the final output is a digital signal or driving currents from digital amplifier 109. If the signal comes from an analog source, it is converted into a digital signal, by a method like PCM, so that it may be processed digitally throughout the system. This conversion can be performed by main processor 107. The input audio signal from source 101 is fed into main processor 107, which makes necessary computations to control volume or tone (i.e., bass or treble), or performs functions such as upsampling or other digital compensation by software emulation via modules 115. The signal then goes to digital amplifier 109, which provides the current necessary to drive a speaker unit 142, 144, 146 of an appropriate frequency range based on the processed audio signal.

Alternatively, the processed digital speaker driving signal could be delivered to a digital amplifier disposed within dummy speaker 140 over a digital connection such as a USB cable or a Firewire connection, or any other suitable digital connection. Inside are digital amplifier units for generating current to drive the speaker units 142, 144, 146.

Figure 7:
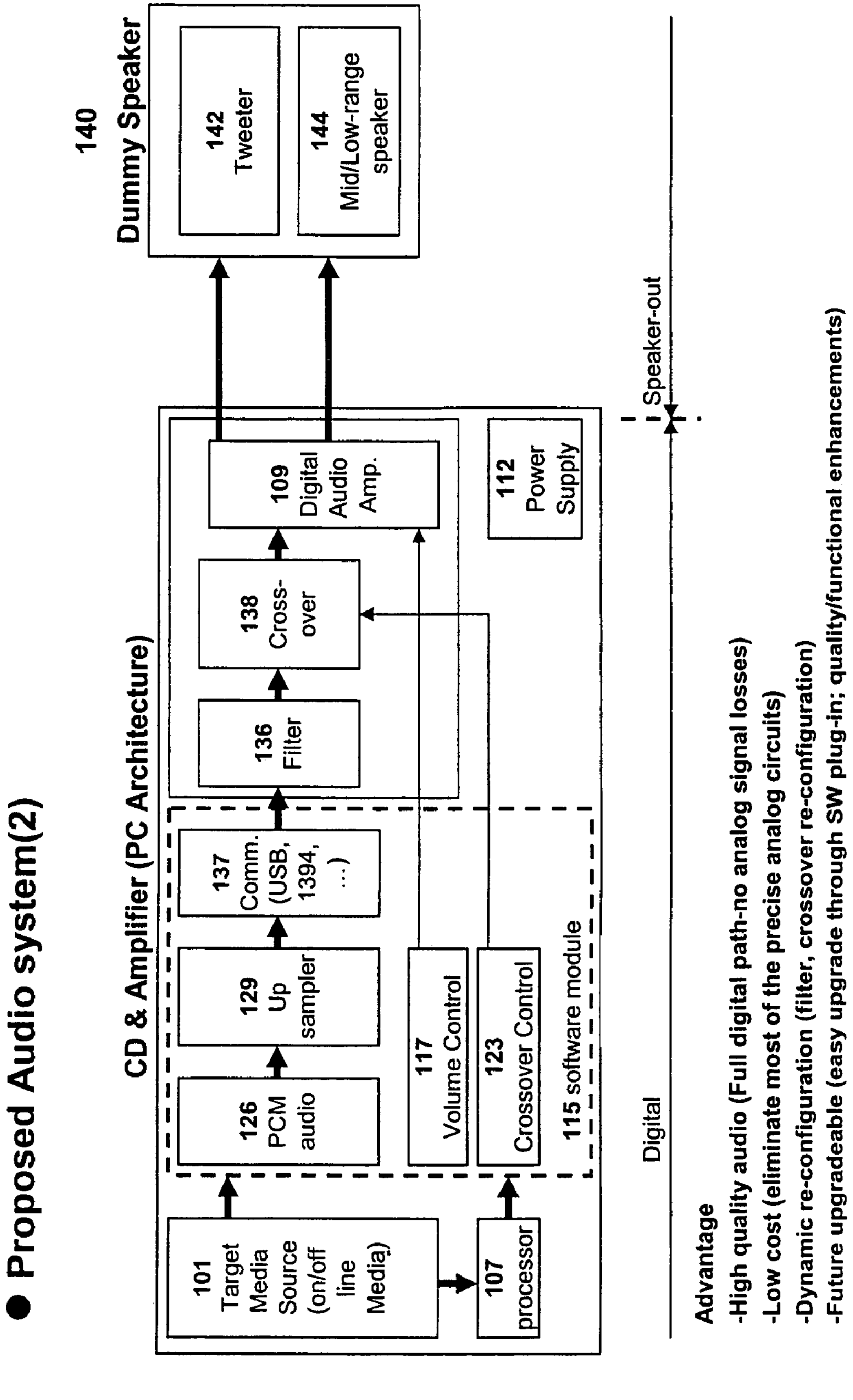
FIG. 7 shows a schematic block diagram for an audio reproduction system according to another embodiment of the present invention.

A feature of the present invention is that the crossover network filtering the audio signal into different frequency ranges may be implemented within the processor, thereby eliminating the crossover network in a typical analog system comprising a set of coils, capacitors, and resistors located within a speaker. The analog crossover network does not provide as precise separations of frequencies as the digital crossover performed by main processor 107 using software 123 as shown in FIG. 6. Alternatively, the digital crossover may be performed by peripheral device 138 in communication with main processor 107 as shown in FIG. 7. Very expensive analog components are required for an analog crossover to even be comparable to a digital crossover. Moreover, the frequency ranges provided by the digital crossover network may be easily adjusted such that a speaker driving signal containing the most optimal range of frequencies is delivered to a given speaker unit. Also, the frequency ranges may be dynamically adjusted while an audio source, like music, is playing. Accordingly, the speaker system may not require cross-over logic. Instead, main processor 107 may send out two, three or several different kinds of speaker driving signals via respective amplifier units 109 that might be directly connected to tweeter, mid-range, or bass unit of the speaker.

Speaker 140 may also be an "intelligent" speaker having a storage device, like an integrated circuit, including performance characteristics of the speaker. Such an arrangement can be implemented in a typical home entertainment system. The performance characteristics can be delivered to processor 107 for audio signal processing by either an active or passive method. In the active delivery method, the circuitry of speaker will transmit the performance characteristics to processor 107. But in the passive method, processor 107 will query the speaker to retrieve its performance characteristics.

These performance characteristics may include: each unit's optimal frequency range reproduction characteristics across the audible spectrum; nominal output power; recommended amplification power; input impedance; speaker housing dimensions; sensitivity; crossover frequency; or the number of sub-speaker components. Alternatively, the speaker 140 may simply include identifier information that tells system 100 what kind of speaker it is, and the processor 107 will look up the performance characteristics for the identified speaker on a table or database associated with the processor.

These performance characteristics can be used by processor 107 to determine the frequency ranges that match up with each speaker unit 142, 144, 146 of the system. These characteristics are also helpful in volume control as the system 100 can determine, for example, the sensitivity of the speaker to volume changes and a maximum speaker driving current before audio output becomes distorted.

Furthermore, the arrangement of speakers can be assisted by these performance characteristics. For the novice user, the system can analyze the speaker and recommend the ideal location or function for such a speaker. For example, a small speaker with a low amplification power may be ideal as a rear satellite speaker. If the bass speaker unit is most responsive to frequencies between 50 Hz and 300 Hz but is less responsive to frequencies between 300 Hz and 600 Hz, then the system can adjust its bass range between 50 Hz and 300 Hz and use a different speaker unit for producing frequencies between 300 Hz and 600 Hz. This eliminates the need for expensive speakers that can reproduce a broad spectrum of frequencies. For example, two five-dollar ($5.00) speaker units that are most responsive to frequencies ranges of 50 Hz to 300 Hz and 300 Hz to 600 Hz, respectively, can easily replace one one-hundred dollar ($100.00) speaker unit capable of reproducing frequencies between 50 Hz and 600 Hz. Other factors can be input to the system such as number of speakers, room size, and the desired listening experience (much like the pre-set surround settings on typical home theater receivers), just to name a few. These recommendations can be subsequently displayed on the display device.

The advanced user who may be an audiophile can view these characteristics on the screen and plan an optimal speaker arrangement for their tastes accordingly. The PCbased architecture gives the system great flexibility in providing a workable user interface for fine-tuning of the system by either the novice or the audiophile.

Figure 15:
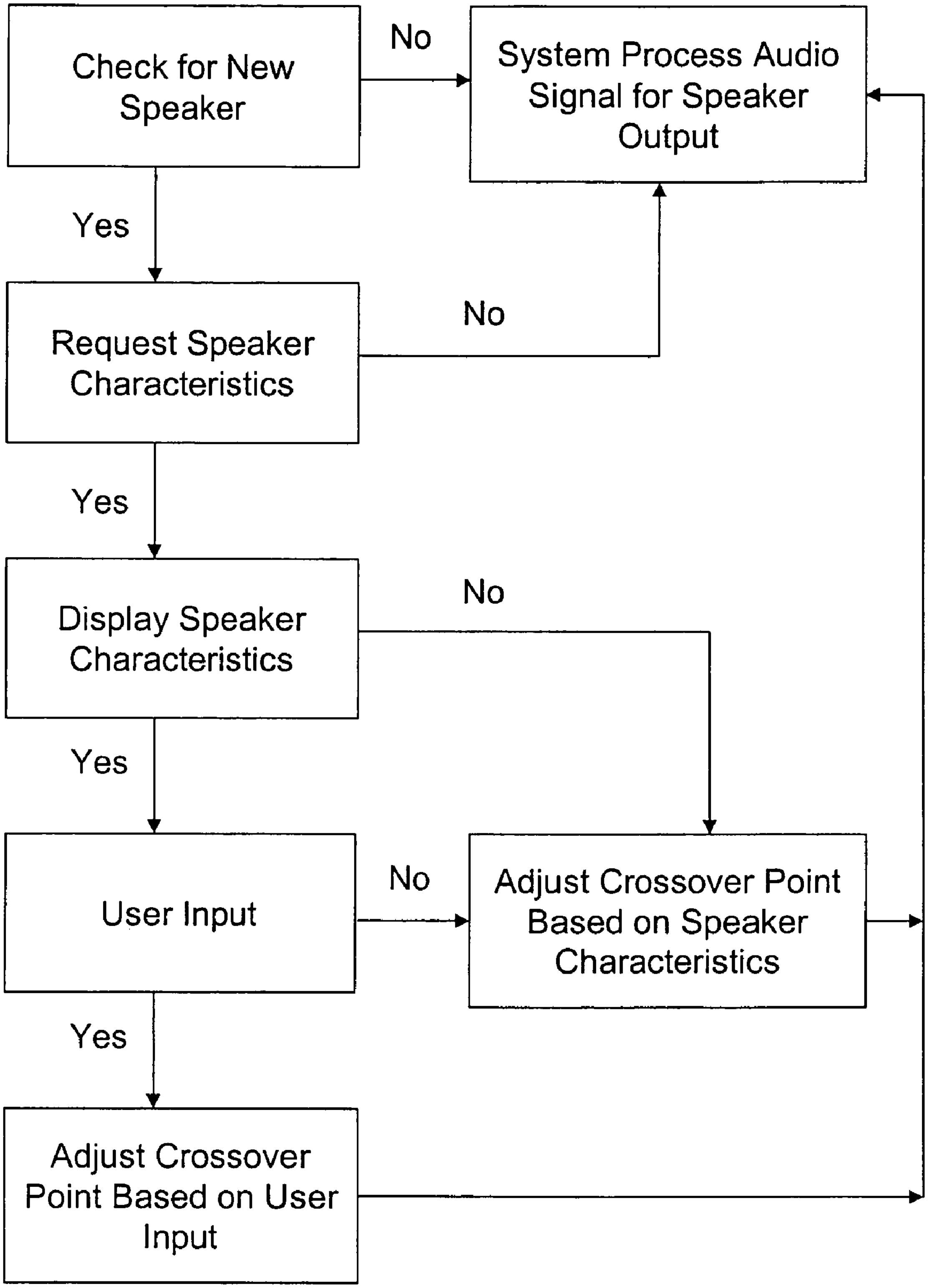
FIG. 15 is a block diagram of a method for implementing an intelligent speaker in an integrated multimedia system according to an embodiment of the present invention.

FIG. 15 is a block diagram illustrating one method of using such an intelligent speaker to adjust the crossover point as an example.

First, the system may check for the new speaker. Next, upon detecting a new speaker, the system will request the speaker characteristics or the system will request the speaker identifier and look up the performance characteristics in response to such an identifier. The system may show these characteristics on a display device. The system may then automatically adjust the crossover point based on the speaker characteristics or may adjust the crossover in response to user input. This adjustment can then used by the system to generate a driving signal and current of an optimal frequency range for driving the speaker unit. If necessary, the user may purchase a different set of speakers or additional speakers, to take full advantage of the system. The system may recommend the speaker units needed to create the optimal listening experience based on the analysis of the system or the listener's preferences.

FIG. 6 illustrates an audio system according to an embodiment of the present invention that includes an audio source 101 like a CD player, software modules 115 coupled to processor 107, an amplifier 109, and a dummy speaker 140 having no crossover logic. The software modules may include: a volume control module 117, crossover module 123, a PCM module 126, an upsampler module 129, a PCM/frequency converter 131, a digital filter 121, a frequency/PCM converter 135, and a communication driving module 137. Crossover module 123 can separate filtered digital audio signals into different frequency ranges, which are delivered to a respective frequency/PCM module 135 for each range. The signals may be converted by communication driving module 137 or delivered directly to digital amplifier 109. Amplifier 109 comprises a plurality of amplifier units 109*a* that correspond to a given frequency range of a speaker unit 142, 144 of dummy speaker 140.

FIG. 7 is similar to the previously described audio system but shows that some of audio processing functions may be instead performed by peripheral hardware devices like filter 136 and crossover 138 coupled to processor 107.

Volume control module 117 can provide further fine tuning of the audio signal by accounting for perception differences of different frequency sound at the same decibel (dB) level to provide equal loudness level for all frequencies in the processed digital audio signal.

As shown in FIG. 16, sounds of different frequencies have different degrees of "loudness" at the same dB level. Human sensitivity to audio depends on the frequency level of a particular sound. Generally, bass sounds are much quieter to the human ear than high frequency, or treble, sounds. While the hearing threshold between 2,000 Hz and 6,000 Hz is close to 0 dB, the hearing threshold at 125 Hz is 20 dB. Therefore, the system adjusts the audio signal so that sounds of all different frequencies are outputted by the speaker units 142, 144, 146 at substantially the same "loudness." This volume control operation can be performed prior to crossover, but it is not required.

Volume control module 117 may comprise logic that incorporates the data included the graph of FIG. 16, to provide an equal-loudness adjustment. For example, if a user requests a volume level equal to 40 phon, then volume control module 117 in conjunction with processor 107 will make an adjustment to the audio signal based on the data of the chart so that a bass sound of 125 Hz will be output at approximately 60 dB and a higher pitch sound of 6,000 Hz will be output at approximately 45 dB. When such an adjustment is made, a listener will hear both sounds as equally loud.

Also, when increasing the volume from 40 phon to 50 phon, the bass sound of 125 Hz should only increase approximately 8 dB while the higher pitch sound of 6,000 Hz should increase approximately 10 dB. Thus, using the typical method of increasing the sound pressure level (dB) across the entire frequency spectrum does not provide a listening experience of equal loudness for sound. The invention can easily make adjustments to account for differences in the human ear's sensitivity to loudness changes for sounds of varying frequencies.

Figure 17:
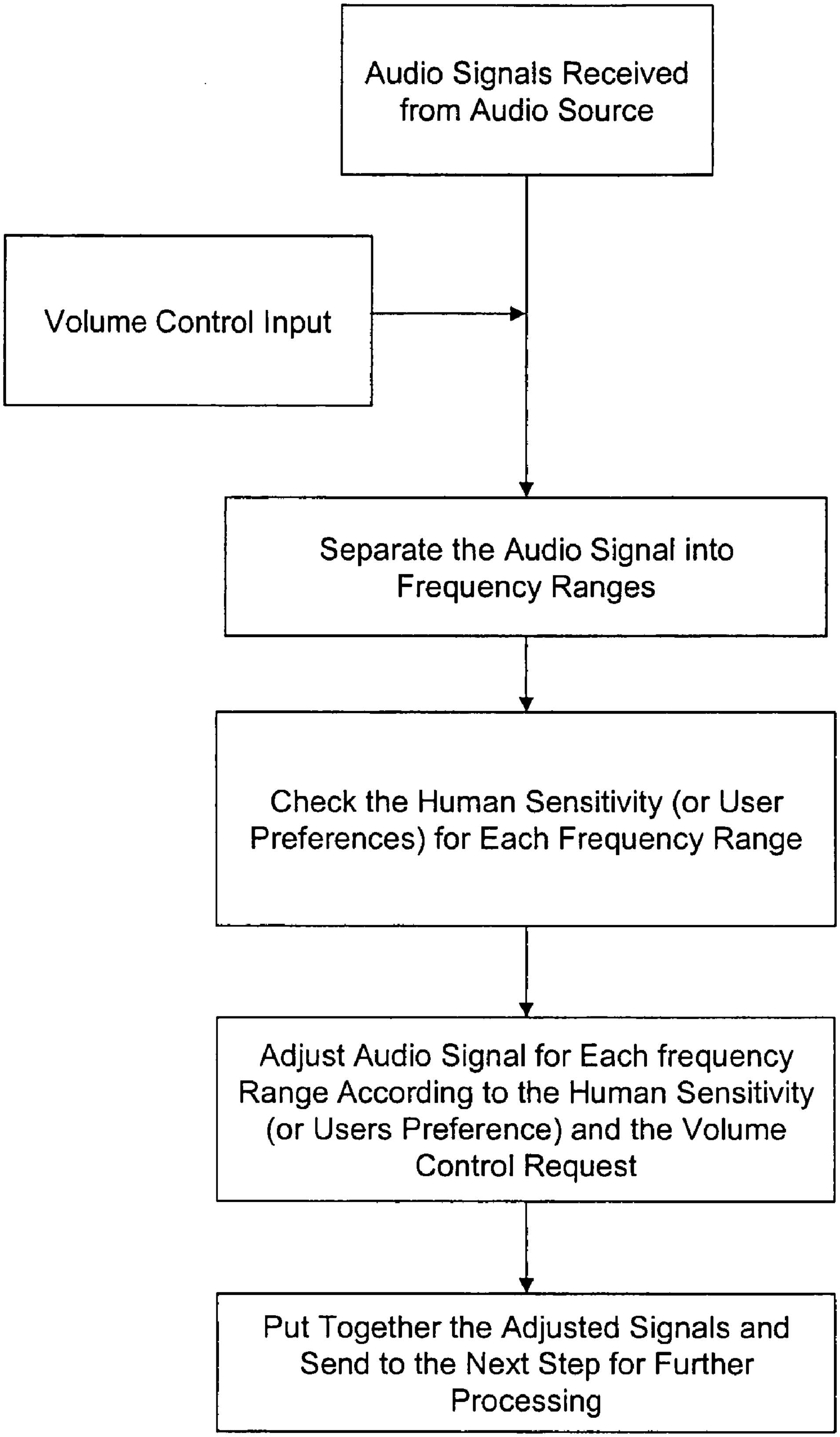
FIG. 17 is a block diagram of a method for implementing a volume control based on the loudness level for a given frequency of sound in an integrated multimedia system according to an embodiment of the present invention.

FIG. 17, shows a block diagram of a method for adjusting volume in such a manner.

The audio signal is received by the processor from the audio source and is processed according to a requested volume control level. The audio signal is then separated into frequency ranges. The volume control module then determines the appropriate dB level for each frequency that corresponds to the requested volume level. This logic can also be modified by user preferences to modify the volume adjustment, say for example the user would like to hear sounds of certain frequencies somewhat louder. The volume control module performs an audio signal adjustment to provide an equal loudness level or a user-defined loudness level. The adjusted audio signal may then be further processed to generate a speaker driving signal or speaker driving current for audio output.

These "loudness" levels can also be modified based on user preferences so that certain types of sounds can be heard louder. For example, if a listener likes more bass, the logic can be modified so that when a 40 phon volume level is requested, the 125 HZ could be output at approximately 65 dB rather than 60 dB. These values can be modified in any manner that the listener chooses.

In addition, audio of equal dB level can sound different depending on the angle of the listener.

Figure 18:
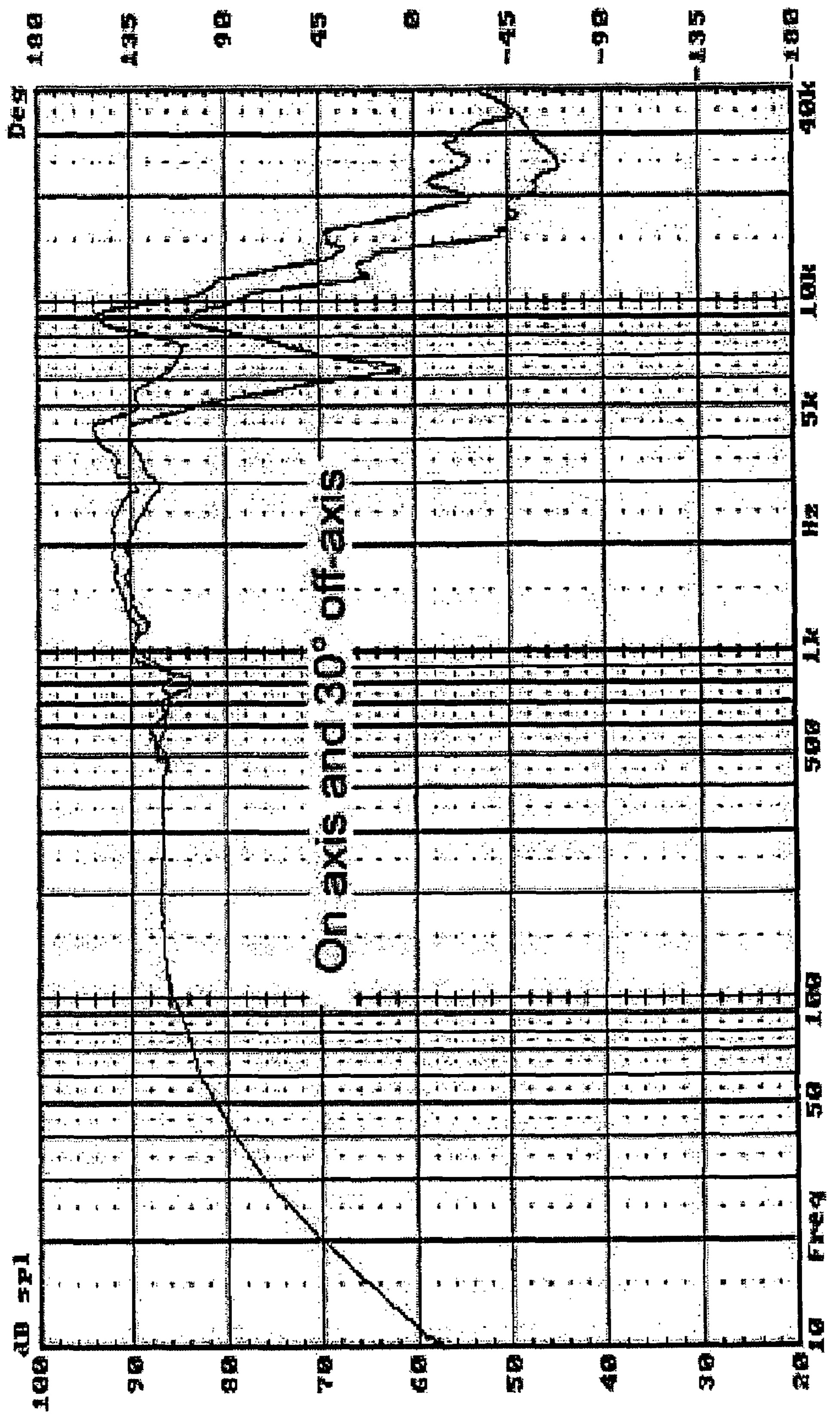
FIG. 18 is a graph showing perceived sound pressure level of different frequencies and such sound measure level with respect to the angle of a listener to audio output at zero (0) degree and at thirty (30) degrees.

Looking at FIG. 18, the dB level at thirty (30) degrees is substantially different from the dB level at zero (0) degrees, especially in the 2,000 Hz to 10,000 Hz range where human hearing is most sensitive. Accordingly, volume control module can also make an adjustment based on the position of the listener.

FIG. 1 shows input device 105, which can be an image capture device like a camera and/or an audio input like a microphone. This input device may provide information to processor 107 and volume control module 117 about the position of the user. Information about the position of the speakers 140 in the room can be acquired via the input device or can be manually input into system 100. Subsequently, an angle between a listener and each speaker can be determined. Volume control module 117, having stored logic containing data for varying angles such as that for 30 degrees as illustrated in FIG. 18, will make an adjustment to the audio signal so that the listener may experience substantially similar loudness regardless of his or her position. Both the horizontal angle (i.e., wall-to-wall) and vertical angle (i.e., floor-to-ceiling) will be determined so that volume control module 117 can make an optimal adjustment no matter the position of a speaker, including, but not limited to, in the wall, in the ceiling, sitting on a floor-stand, or sitting on a raised shelf.

Figure 19:
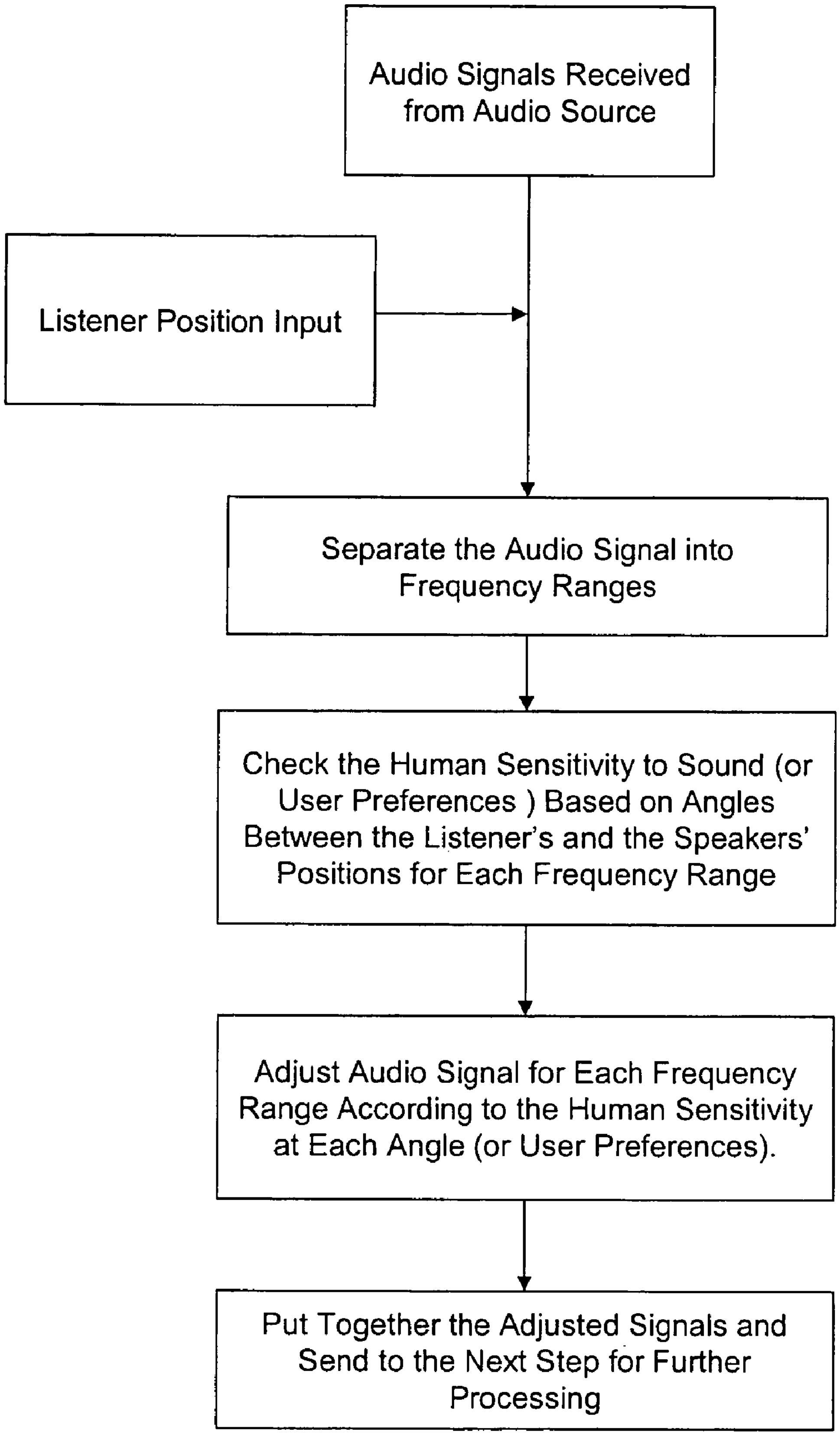
FIG. 19 is a block diagram of a method for implementing a method of volume control based on a listener's position in an integrated multimedia system according to an embodiment of the present invention.

FIG. 19 is a block diagram illustrating such a method for adjusting the volume based on the angle of the listener to the speakers.

The method is similar to the method illustrated in FIG. 17. However, after separating the frequencies the volume control module determines any sound pressure level (dB) loss or gain resulting from the angle of the user to each speaker based on information like that contained in FIG. 18. As before, the user may modify the dB gain or loss for certain frequencies in order to highlight certain types of audio output. The volume control module can then make an adjustment for each frequency range based on the human sensitivity of sound at an angle or user preferences. Again, the adjusted audio signal may then be further processed to generate a speaker driving signal or speaker driving current for audio output.

Furthermore, input device 105 can also determine a distance of the user from each speaker. Therefore, volume control module 117 may also adjust the volume of each speaker 140 based on the listener's distance from each speaker.

Figure 20:
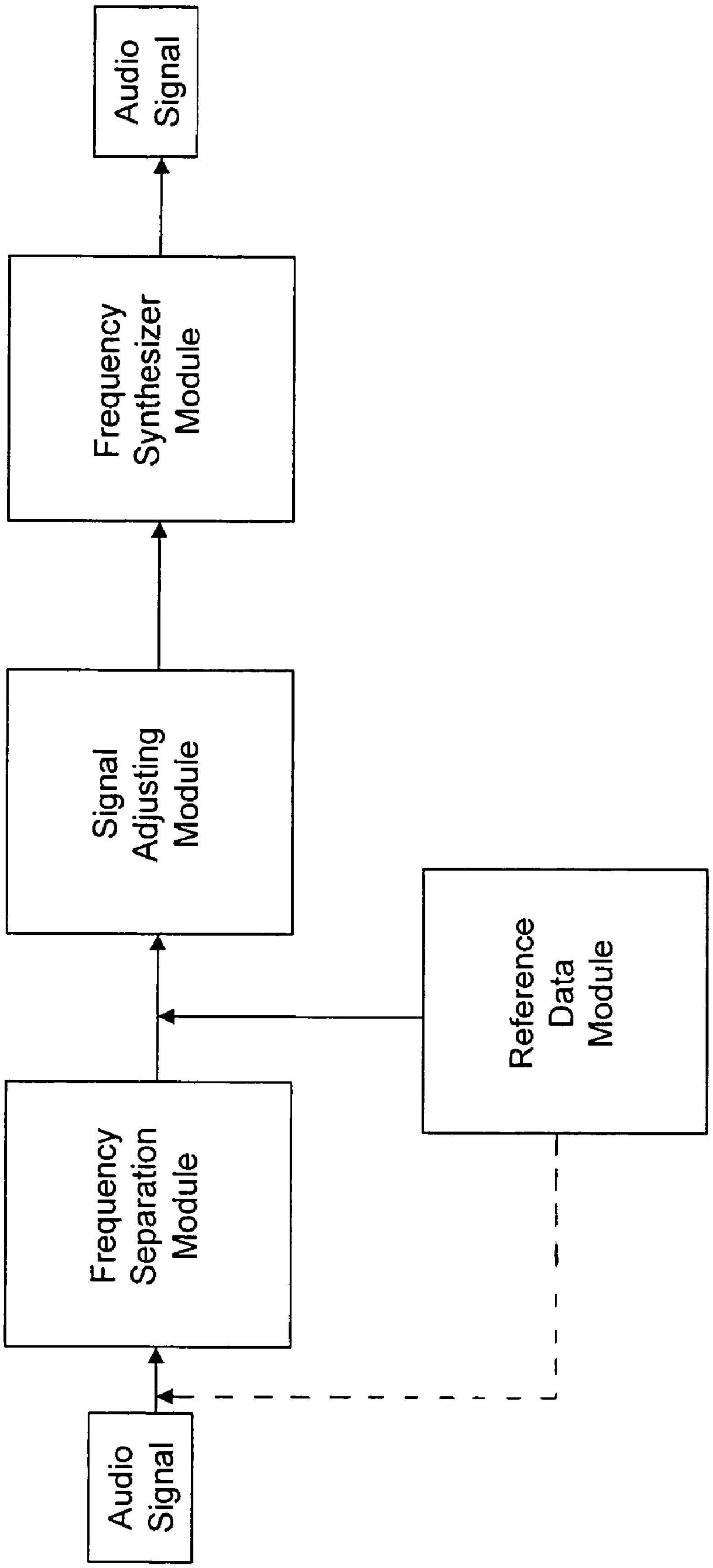
FIG. 20 is a block diagram of a digital volume control module.

FIG. 20 illustrates the operation of a digital volume control module according to an embodiment of the invention. The audio signal may be delivered to a frequency separator module. At this time, optionally, a reference data module may analyze the inputted audio signal and may provide information regarding the number of frequency ranges the audio signal should be separated into. The frequency separator module then separates the audio signal into a plurality of frequencies. The reference data module then supplies the appropriate reference data (e.g., human sensitivity based on frequency ranges or an angle from a sound source) corresponding to each frequency range. The signal adjusting module then makes an adjustment to the separated frequency ranges based on the supplied reference data. Next, the adjusted frequency ranges are combined to generate an adjusted audio signal which is then forwarded for additional processing to generate audio output.

The system provides additional digital control of audio signals thereby permitting the delivery of tailored speaker driving signals to the dummy speaker.

These dummy speakers according to an embodiment of the present invention may also be modified in a Lego®-like modular fashion because they are not limited by the fixed crossover frequency range logic generally contained in a typical speaker. Therefore, a user can switch out individual speaker sub-units to obtain an optimal listening experience based on that user's preferences or the type of media the user listens to.

The present invention also provides another benefit by integrating all the processing and computation within a main processor. For example, by using digital filters, the present invention can provide the characteristics and feeling of the softness and warmth of tube amplifiers, or a phonograph. Also, the present invention can easily provide the functionality of an equalizer, an upscaler, or a digital crossover network.

Figure 8:
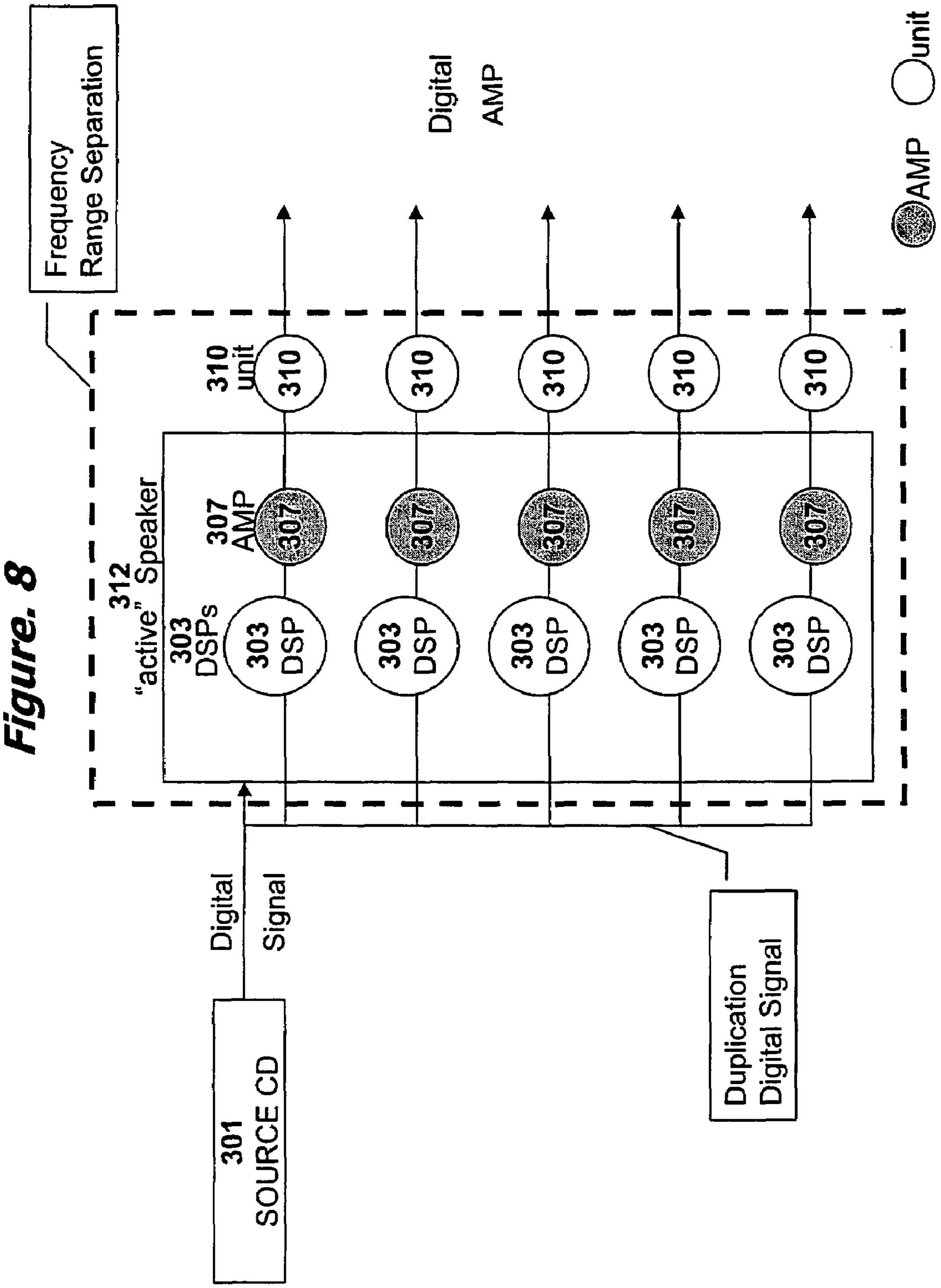
FIG. 8 shows a schematic block diagram for a typical digital crossover system.

Presently, a digital crossover network is sold as a separate component and one design of such a device, known as an "active" speaker 312, is shown in FIG. 8. It is nothing but a combination of separate digital signal processors (DSPs) 303 and separate digital amplifiers 307. In other words, digital signals from a source 301 like CD player are separated using four or five different DSPs. Each DSP 303 provides signals of different frequency ranges that are delivered to a respective digital amplifier 307, which generates driving currents for each speaker unit 310. The present invention can implement these functions in one processor, which may have a PC architecture disposed therein, without adding expensive equipment. Furthermore, by adopting such architecture, the present invention allows dynamic adjustment of frequency levels. In other words, the present invention enables user to adjust the frequency levels to whatever level whenever he or she wants to, by simply entering the ranges through the conventional input device, or automatically as programmed before. On the other hand, the typical digital crossover network does not provide such features and convenience of use.

Now turning to video display, the most popular video sources are currently analog TV, DVD, and digital TV.

Figure 10:
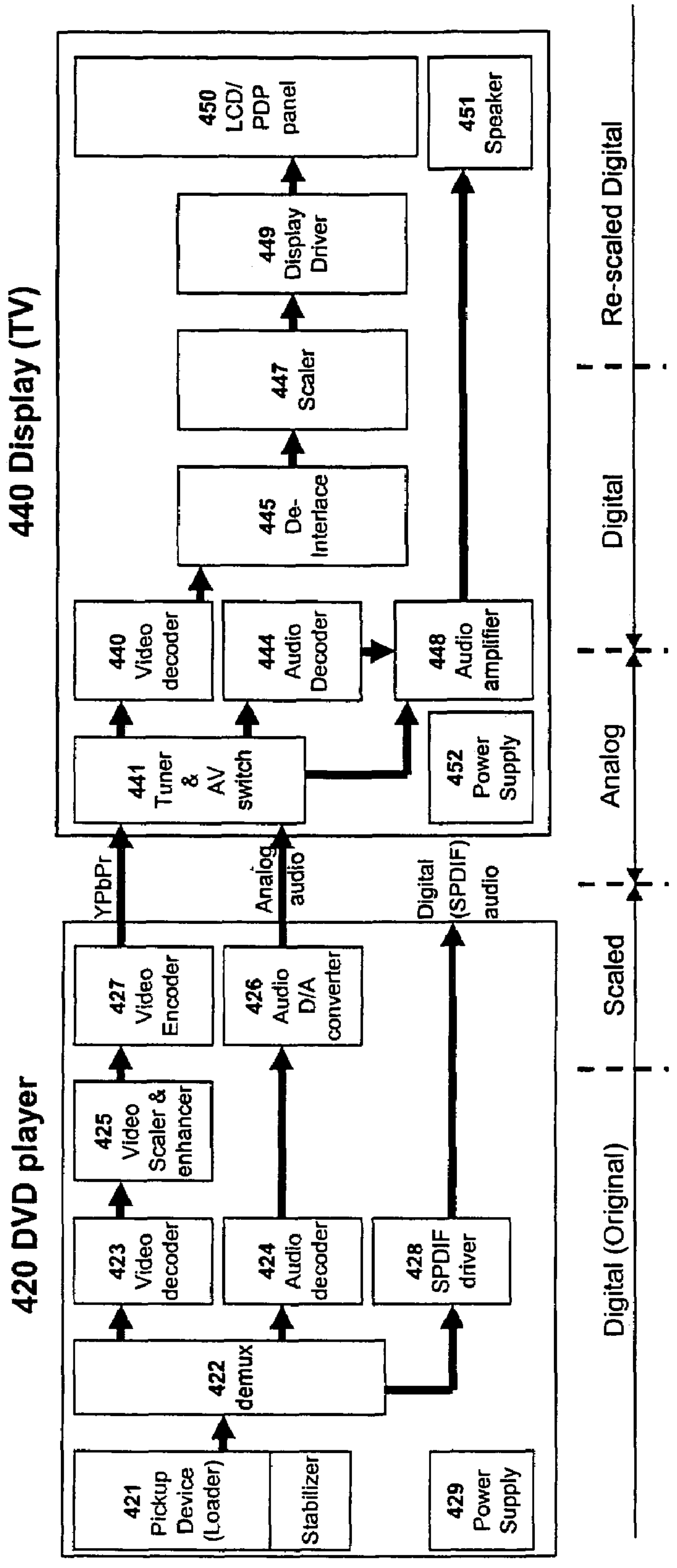
FIG. 10 shows a schematic block diagram describing an operation of a known video system with a typical DVD player and display.

FIG. 9 shows a schematic block diagram of a typical analog TV display and FIG. 10 shows a schematic block diagram of a known DVD display configuration. Signals selected by a tuner 401, which is a composite signal, go through a filter such as a 3D comb filter 405 to produce a luminance signal (Y-signal) and a color signal (C-signal). A composite signal may also come from a composite input 402 of another video source such as a VTR. The Y-signal and the C-signal pass through a second filter 409 for ghost reduction and noise reduction. The C-signal then goes through a color separation filter 413 to generate a blue signal (U-signal) and a red signal (V-signal). The U-signal and the V-signal together with the Y-signal form a component signal having YUV data in a conversion filter 417. Images are displayed using an RGB signal from the YUV data.

If an S-Video input 410 is used, the signal does not need to pass through either comb filter 405 or second filter 409 because the Y-signal and C-signal are kept separate.

DVD may contain YUV data in a 720×480 format. Digital TV broadcasts YUV data encoded using MPEG 2 protocol. Digital TV may have different formats such as, for example, 1080i, 720p and 480p. Digital video sources also may provide different interface protocols such as component video (Y Pb Pr), high-definition multimedia interface (HDMI), and digital video interface (DVI). A component video interface 414 keeps the Y-signal, the U-signal, and the V-signal separate such that the video signal can be delivered directly to conversion filter 417. Output source signals from digital interfaces like DVI or HDMI 418 for a digital display 440 can be input directly to the de-interlacer scaler 419 and do not need to pass through any of the filters that may be required for an analog display 430. Thus, a digital display 440 only needs additional signal filtering to be compatible with analog interfaces, even though the original source may be digital, like a DVD or digital TV.

For example, in the typical DVD playback system of FIG. 10, there is a DVD player 420 and a display device 440. DVD player 420 includes a pickup device 421, a demux422, a video decoder 423, a video scaler and enhancer 425, a video encoder 427 for processing a video signal. DVD player 420 further comprises an audio decoder 424 and a digital/analog converter 426 for providing analog audio signals, and a Sony/Phillips Digital Interface Format (SPDIF) driver 428 for providing digital audio signals. Display device 440 includes a tuner 441, video decoder 442, de-interlacer 445, a scaler 447, a display driver 449, and a display apparatus 450 for displaying video signals. Moreover, display device 440 includes an audio decoder 444, an amplifier 448, and a speaker 451 for providing audio. Both DVD player 420 and display device 440 include a respective power supply 429, 452. It is apparent to a person having ordinary skill in the art that there are many redundancies in the functions of the DVD player 420 and display device 440, which is in part caused by the requirement to convert audio/video signals to allow signal communication between these components.

In addition, while a DVD player 420 may have a digital interface like DVI or HDMI, the additional processing components in display device 440 are still needed because the DVD player cannot dynamically adapt for the resolution of the display and the display is required to be compatible for a wide range of non-digital interfaces.

Further, to accommodate various formats and interfaces, many display devices provide at least three different interface terminals. In some cases, they provide five different terminals. Video source players often provide many different terminals as well. These interfaces are both analog and digital.

Therefore, each video source player and each video display has its own converter that can convert signals coming through different interfaces into YUV data. Moreover, the display may include many image filters as described above for processing the analog signals from many different interfaces into YUV data for display. These additional and sometimes redundant components may be easily eliminated by the present invention.

Also, a digital video display requires an additional processing step for image display. Modem video displays, such as an LCD, a PDP or a DLP™ projector, have a native resolution, for example, 1920×1080, 1280×720 or 865×480. These resolutions are fixed when the displays are manufactured, because they have a maximum number of lines and a maximum number of pixels per line.

Therefore, once a digital display device receives a video source signal, it has to resize, or scale, the signal to make it fit for the panel size using de-interlacer/scaler 419.

Figure 11:
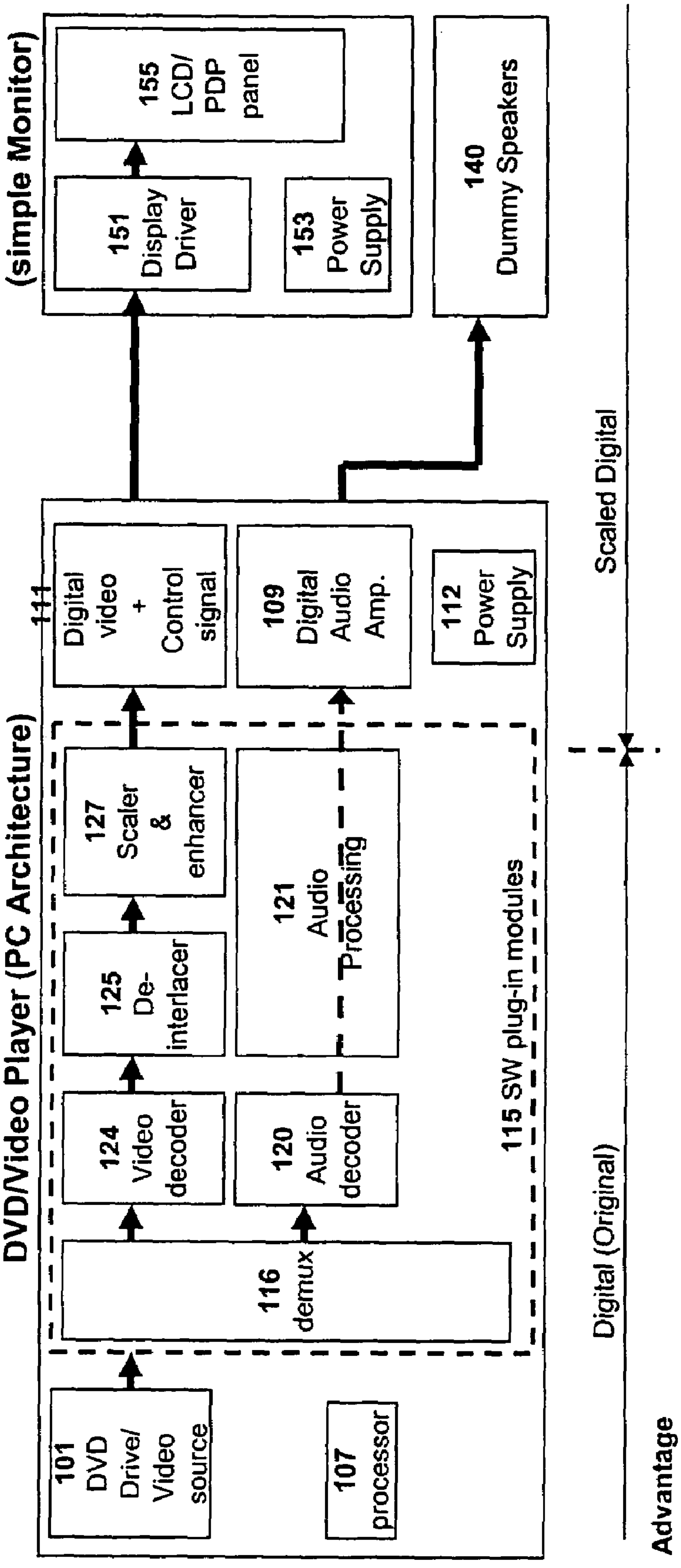
FIG. 11 shows a schematic block diagram for a video reproduction system according to an embodiment of the present invention.

FIG. 11 shows that the present invention, however, can perform such resizing using main processor 107 coupled to software modules 115. Other compensation and manipulation of the video signals can be also performed in the main processor, which may be coupled to a variety of software modules, including: a demux 116, a video decoder 124, a de-interlacer 125, a scaler and enhancer 127, an audio decoder 120, and audio filter or processor 121. Here, main processor 107 uses software modules 115 to process the signal from source 101, which can be digital or analog. Signal processing can also be performed, however, by peripheral hardware devices coupled to processor 107.

The processed audio/video signals are delivered to a DVI transmitter 111 and a plurality of amplifier units of amplifier 109. If amplifier is analog or a digital/analog hybrid, a conversion of the digital signals can be performed by audio processor 121 or in amplifier 109 itself. The processed video signals are sent to a dummy display 150 that may comprise simply a display driver 151, a power supply 153, and a digital display device 155. The amplified audio signals are sent to dummy speaker 140 in a similar manner as described above.

Accordingly, high quality audio and video can be provided due to the full digital signal path with only one scaling performed in the processor. Further, the display can be easily upgraded by adding a new software plug-in, thereby enhancing both display quality and function.

Therefore, the display's manufacturing costs may be dramatically reduced by connecting a dummy display device that does not contain any devices for processing or converting video signals to the integrated main processor box. Instead, a simple LCD/PDP panel with only driver parts may be used that can provide a high-resolution display at a greatly reduced cost. Because of the processing power that a CPU such as an Intel Pentium® 4 provides, main processor 107 can perform most of a conventional TV's functions, such as, for example, tuning, filtering, signal selecting, de-interlacing, and resizing.

Even from an analog TV source, once a composite signal is selected from RF signals, the present invention can digitally capture the composite signal and perform all the filtering operations to generate YUV/RGB signals for display using software modules plugged in to main processor 107, or peripheral devices associated therewith. Therefore, by digitally processing even the typical analog TV signals, most of the analog components may be eliminated to substantially reduce the signal loss and distortion caused by the signal conversion.

An embodiment of the present invention can perform most of these signal conversions in one central place. It can also detect whether the TV signals received are analog or digital. It may detect the characteristics and properties of the display device connected to the system. All the manipulations of the digital data may be performed within the main processor 107 using software modules 115. However, if necessary, the main processor may comprise more than one physical chip. It may include another CPU or other periphery chips. A benefit of the present invention is that unnecessary conversions from digital to analog or analog to digital may be reduced or eliminated.

As a result, the system can control video properties like, for example, brightness, contrast, color warmth and display resolution. Users can control these properties manually as well as automatically using optimization parameters. Users can generate such parameters by themselves or acquire these parameters from either other users or a content provider. Further as noted above the processor can resize the display signal so that it is appropriate for the display resolution. Lower resolution signals, however, are difficult to view on larger screens because the flaws in these low resolutions signals are easy to see on larger screens. This is especially problematic when using an overhead DLP™ projector on a screen of 72 inches (6 feet) or greater that are now used in many home-theater systems. It is the same for a large size flat panel displays, such as, for example, a 102-inch PDP or 80-inch LCD. Accordingly, the processor can make adjustments to these lower-resolution signals so that they display more clearly on large screens. Such an arrangement, will allow many home-theater users to view standard definition programs as well as high-definition programs on their systems.

The system can also make an adjustment of the display frame rate to take full advantage of the display capabilities of modem digital display devices. For example, the movies recorded on DVD have a frame rate of 24 frames per second (fps), and NTSC DVD specifications call for a refresh rate of approximately 30 fps. But modem digital displays are capable of display refresh rates of greater than 72 Hz, which translate to 36 fps or more. Therefore, the system can generate intermediate frames based on analysis of two adjacent frames to increase the number frames per second displayed on the digital display of a higher refresh rate. The system can also make adjustments based on the motion in a scene displayed from the video source and make an adjustment accordingly, including a higher frame rate.

For example, in a high speed panning scene, one (1) inch on a 32-inch display can correspond to approximately four (4) inches on a 120-inch display. Therefore, a user may notice an interruption on the 120-inch display, which he or she may have not noticed on the 32-inch display.

In order to resolve these problems, the present invention can provide a solution. When conventional movies with a frame rate of 24 fps recorded onto DVD are subsequently played on a modern digital display, which is capable of a display refresh rate of greater than 72 Hz, typical methods show duplicate scenes for the extra frames.

Figure 14:
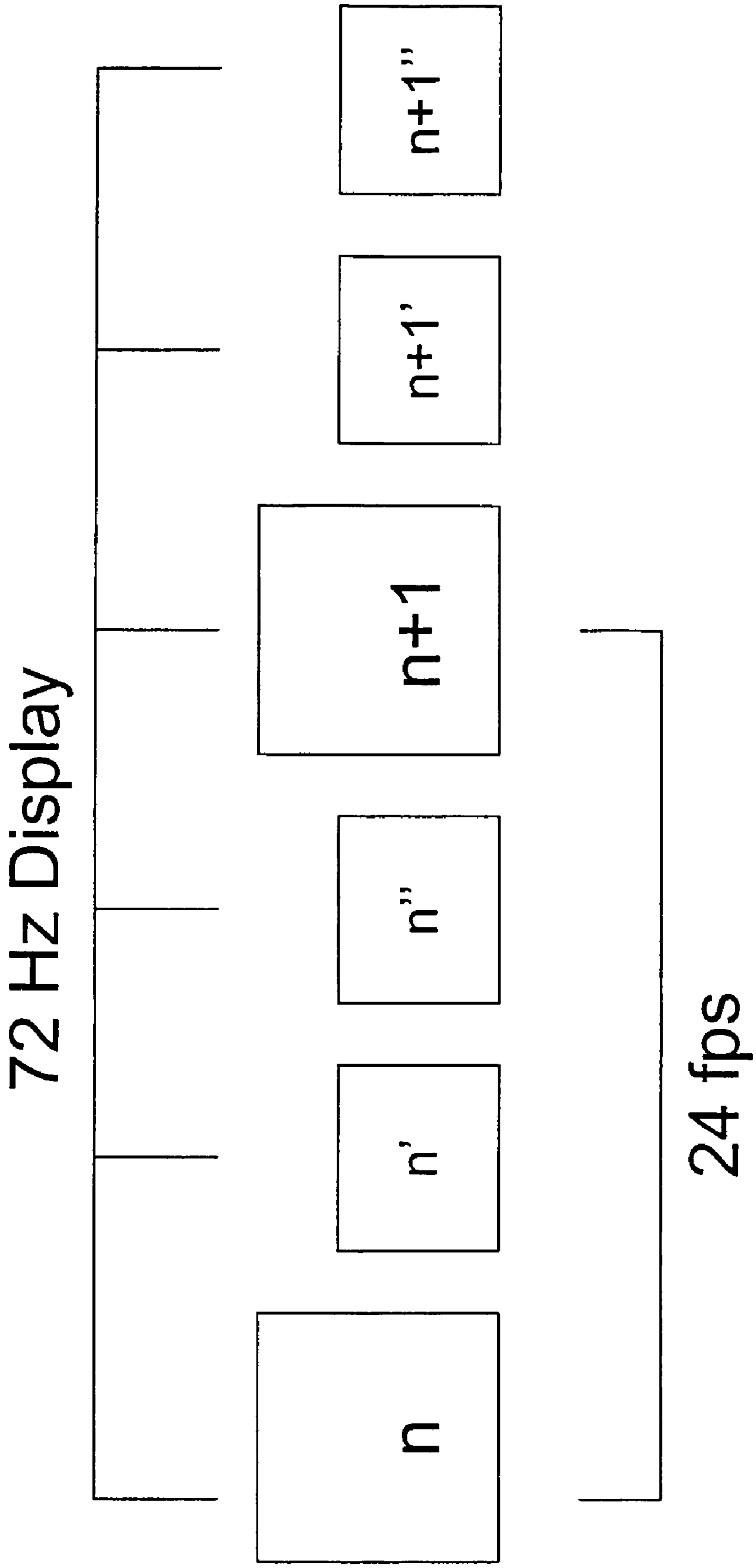
FIG. 14 shows a frame rate adjustment to a video signal from a video source according to an embodiment of the present invention.

As shown in FIG. 14, a display with a 72 Hz refresh rate may show an extra two (2) frames in addition to the original frames of 24 fps movies.

The conventional method shows the same $(n)^{th}$ scene on the $(n)'^{th}$ frame and the $(n)''^{th}$ frame. The same is true for $(n+1)^{th}$ frame as the $(n+1)'^{th}$ frame and the $(n+1)''^{th}$ frame both display the same $(n+1)^{th}$ scene.

However, the present invention may allocate weights for each additional frame. For example, the $(n)'^{th}$ frame may be a composition of 65% of $(n)^{th}$ frame and 35% of $(n+1)^{th}$ frame.

The $(n)''^{th}$ frame may be a composition of 35% of the $(n)^{th}$ frame and 65% of $(n+1)^{th}$ frame.

The $(n+1)^{th}$ frame group is adjusted similarly. The $(n+1)'^{th}$ frame comprises 65% of the $(n+1)^{th}$ frame and 35% of the $(n+2)^{th}$ frame. The $(n+1)''^{th}$ frame comprises 35% of the $(n+1)^{th}$ frame and 65% of the $(n+2)^{th}$ frame.

These frame adjustments can be summarized as follows:

$$n'=n*0.65+(n+1)*0.35$$

$$n''=n*0.35+(n+1)*0.65$$

By applying weights for each additional frame, viewers can appreciate better quality of video display. The weights shown here, such as 65% and 35% are arbitrary numbers for illustrative purposes only and may vary depending on the purposes of frame rate compensations, characteristics of the scene, tastes of the viewer, viewing environment and other factors, and should not be construed as being limited to these factors.

Looking at FIG. 11, if source 101 is an RF tuner that picks up a certain channel from the RF signal, those composite signals are digitized through a demodulator (not shown) at once, which can be a software module 115 or a peripheral device coupled to processor 107, and the converted digital signals are manipulated through the CPU without going through filters or other upscalers. Therefore, the final output signal is just nothing but a digital RGB signal which can be input to the digital display device 150, such as PDP, LCD or DLP screen displays.

Moreover, set-top box functions like tuning and decoding of cable, satellite, or antenna signals can be performed within the system. A signal source may be directly connected to the system, which then performs the necessary functions to deliver the appropriate signals for processing so that they can be viewed or heard.

Centralized processing of multimedia signals provided by the present invention allows simplification of each device's hardware configuration by eliminating redundant processing and unnecessary signal conversions, thereby lowering manufacturing costs. Centralized processing can also provide digital processing of signals from the source to the last-end and provide high quality image and audio signals with superior control.

The present invention provides integrated and centralized processing of audio signals, video signals, and other information signals, enabling the elimination of unnecessary signal conversions when signals are sent to different components by functional decomposition of the conventional components.

Referring to FIG. 10, a typical DVD contains YUV data using MPEG 2 compression and has a 480i×60 field format. A conventional DVD player first decompresses the signal read by the laser pick-up device. The decompressed YUV data is then processed depending on the display to be used. Such a process may include, but is not limited to, conversions to composite signals for an analog TV or a VTR, de-interlacing for non-interlaced display device, resizing for the appropriate screen resolution, and color enhancing. Details of these processes are well known in the art and one of ordinary skill would know the kinds and methods of signal conversions necessary for displaying different video signals.

The present invention can perform all these processes in main processor 107. Therefore, the preferred embodiment of present invention may substantially reduce product costs by eliminating signal processing devices from each of the components (TV, VTR and DVD player). At the same time, the overall performance is improved by utilizing much more powerful processor for signal processing than the conventional parts used in the individual TV or DVD player. These advantages of the present invention are better realized by utilizing digitally coded video and audio sources with a display that can be digitally operated pixel by pixel.

More details about the operation of a DVD player according to the present invention are described below. A DVD contains video signals using an MPEG-2 decoding protocol and the format is 480i×60 fields per second. Thus, 240 odd line signals are displayed for 30 fields and 240 even line signals are displayed for the other 30 fields. The odd and even lines are alternately displayed to form a whole image.

High definition display devices, however, can provide much better resolution than the DVD's inherent resolution. There are certain methods that may increase or enhance DVD output signals. One way is to pick up the 480i signal from the source pickup device and de-interlace those signals. Then it doubles the scan lines and sends a signal of 480p×60 fields to the display device. That is what we usually call a progressive scan, which means that all 480 lines are displayed at the same time. HD-Q DVD does more than this. It resizes the 480 line signal into a 720 line signal, and then does a progressive scan. Such a resizing and progressive scan can be done in a video source player, such as DVD player or in the display itself.

However, the present invention enables such functions as de-interlacing and resizing (i.e., scaling) to be performed in main processor 107. All of these functions that are performed by different components may be implemented in main processor 107. This prevents redundant investment in different components and by saving those resources, we can extract better quality or much enhanced display performance with the same or even less resources.

In other words, after obtaining raw digital data signals from a video source, the present invention first processes and then outputs them to the digital display device, such as LCD, PDP or DLP™ projection TV. This is especially advantageous for video, which does not require a conversion to drive the output device, because the final output from the processor can be digital signals used directly by the digital display device. By doing so, we may eliminate analog-digital conversions once a digital signal is obtained. This dramatically reduces the possibility of signal distortion and noise in a very inexpensive manner. Not only that, as noted above in operation as an audio device or a TV, the present invention can reduce the production costs for the end components, such as the digital source pick-up device and the digital output device, by eliminating redundant conversion devices. The present invention can also provide a very flexible architecture because most of the signal compensation, resizing, or conversion can be performed using software. Therefore, if a new version or new protocol comes out, the device can be easily updated by simply upgrading the software.

Further, the present invention provides a flexible architecture that allows the system to efficiently adapt to the components attached to the processor box. Generally, once the video source signal is decoded and output to the video display, the video display may have to convert the signal depending on the native resolution of the display device.

For example, even though the video source outputs a high resolution signal of 1920×1080 format, if the display's native resolution does not meet such a high resolution, the video display will need to resize the high resolution signal down to 1280×720 or 865×480 format for it to be displayed according to the display's resolution. This requires additional unnecessary signal conversions, which may degrade signal quality and, thus, image quality.

The present invention may resolve these problems, taking advantage of its flexible architecture to use main processor 107 for converting the signal to a format that exactly matches the display's native resolution. The system may detect the size, the resolution or other characteristics of the display, either by user input or by communication with the connected display. In the latter case, the display may forward its display characteristics to the system's main processor upon request.

Main processor 107 can output 1920×1080 high resolution signal if the attached display can support such a high resolution. If the attached display only support up to 865×480 resolution, then main processor 107 can easily convert the video signals to that format and send them to the display. Accordingly, the present invention can provide signals that may exactly fit any given display device because all the output signals are processed by a main processor using software, rather than through physically separated and dedicated conversion chips or circuits.

Other types of conversions can be made by the processor to account for abnormalities in the display. For instance, a display device may need higher-end optical elements, like lenses, light sources, mirrors, front glass plates, and sensors, for example, to provide a true high-definition display. Otherwise, abnormalities in these elements can degrade the quality of the image output. U.S. Patent Application Publication 2004/076336 describes a method for "warping" the image so that a corrective effect to overcome these abnormalities in either an image capture or image display device can be achieved. A processor is used in either the capture device or display device itself.

In another embodiment of the present invention, however, main processor 107 can be used to make these corrective adjustments to the video signals. The main processor can perform such adjustments through software or with the assistance of a special peripheral circuitry, like the Silicon Optix sxW1-LX chip. Thus, the need for placing additional processing circuitry in the display may be eliminated, which allows the production of a high quality display at a lower price.

DLP™ rear projectors also pose a special problem for digital displays because, unlike PDP and LCD displays, they are not flat and can take up a lot of room for larger display sizes. In a rear projection DLP™ display, an image projector projects an image onto a mirror at the back of the display case, which reflects the image onto the screen for viewing. For larger screen sizes, there must be a sufficient projection distance between the screen and mirror for the reflected image to be displayed properly. Thus, DLP™ rear projection displays were relatively bulky as compared to other digital display types. To reduce the depth of these displays, a curved mirror was implemented to reduce the projection distance needed for achieving a larger display. Another typical way of reducing the projection distance is to reflect the image off of more than one mirror, which may also be disposed at a wide angle as compared to the viewing angle. However, the images displayed by these alternatively configured rear projection DLP™ rear projection displays often are distorted.

U.S. Patent Application Publication 2003/0231261 addresses these problems by "pre-distorting" the image in a manner that uses the distortion caused by the DLP™ display's configuration to display an image correctly. The present invention obviates the need to provide such pre-distortion in the display itself. Rather, this distortion may be performed by main processor 107 so that an embodiment of the present invention may use an integrated multimedia processing system with a dummy DLP™ rear projection display having a reduced projection distance requirement.

Such a pre-adjustment of images that can be achieved by the present invention is not limited to a rear-projection display. For a regular projector display, the present invention can make pre-adjustments for the correct display of images based on the properties and characteristics of lenses and other optical equipment. Therefore, high-end components and lenses, which greatly increase a display's cost, may not be required to achieve a high quality image display.

All the information on the display characteristics can be stored in the display and can be fetched by the main processor of the system when necessary.

In summary, the present invention finally integrates audio, video, Internet, and media storage in one functional device, taking advantage of developments in digital audio/video sources and digital display devices. Thus far, we have described the system and method of the present invention that takes advantage of digital audio/video source and recently developed digital video displays to provide a higher quality audio and video experience. The aspects of the present invention with respect to the Internet and storage functions will now be described.

In another embodiment of the present invention, a storage device may be included with the integrated multimedia processing system that can facilitate dynamic customization of the system depending on the audio or video source. By decomposing the functions of the typical components of the home entertainment system and implementing those functions in one processor, it also makes it possible to control the rather complex multimedia system using one simple control interface. Thus, another aspect of the present invention is directed to an integrated multimedia control system with music or video and other multimedia sources stored in a mass storage device.

Figure 12:
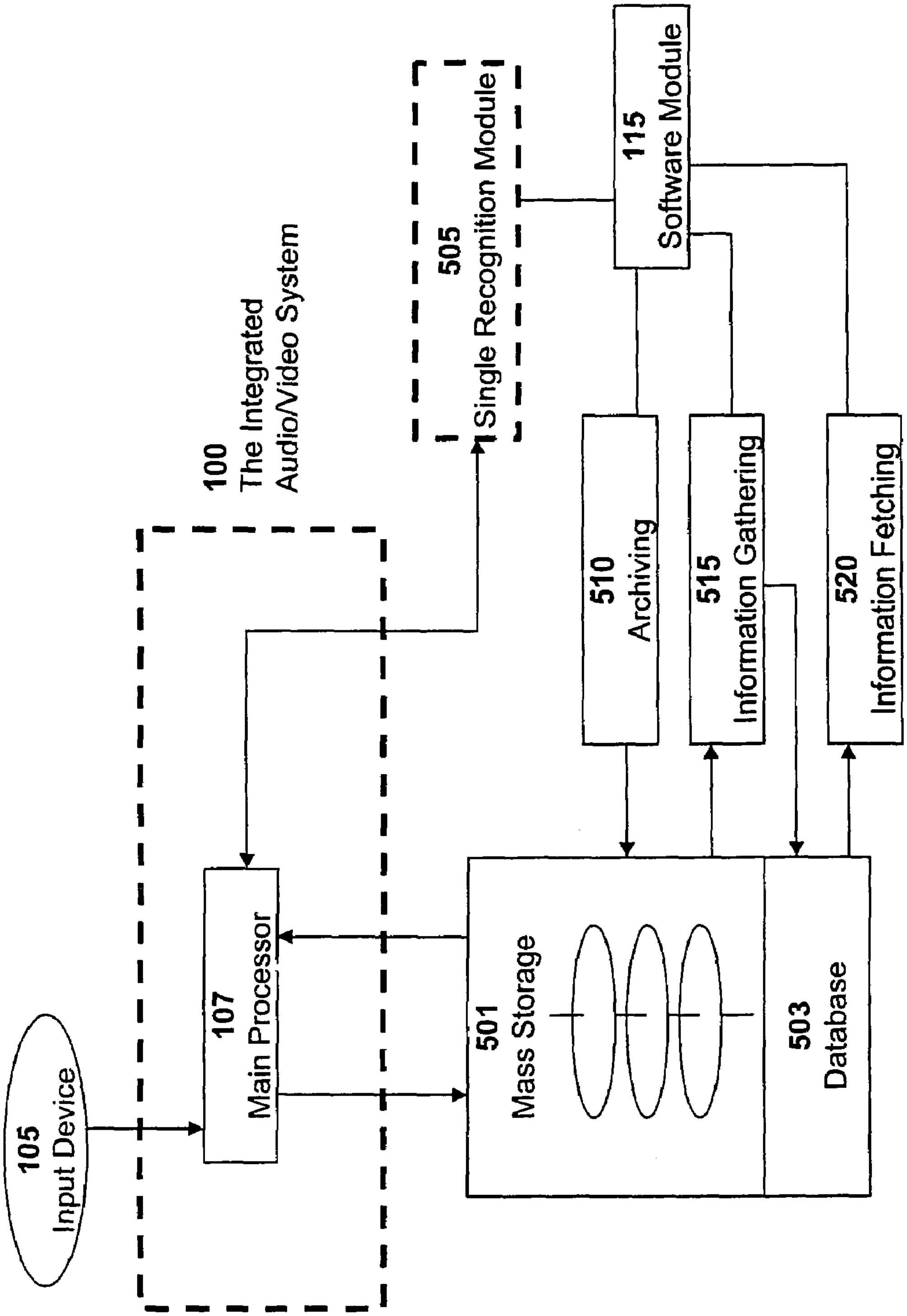
FIG. 12 shows a schematic block diagram for an automatic preference control system according to an embodiment of the present invention.

FIG. 12 shows a mass storage device 501 in communication with main processor 107 of system 100. Mass storage device can be coupled externally or internally to integrated audio/video system 100 and include a database 503 for storing media characteristics. Optionally, a signal recognition module 505, which can be a software module coupled to processor 107, may be included. Other software modules 115 may include: an archiving system 510 that archives content in storage device 501; an information gathering system 515 for analyzing stored off-line content in conjunction with the archiving system 510 or real time content in conjunction with signal recognition module 505 for use in database 503; and information fetching system 520 for retrieving analyzed content characteristics from database 503.

Signal recognition module 505 can recognize certain types of signals that may be specific to the type of audio presented or the type of image displayed. For example, certain audio signal characteristics may be associated with an optimal presentation of jazz music, or certain video signals may be associated with an optimal display of kinetic scenes in action movies. The advantages of providing a signal recognition module, or other similar feedback and control mechanism, are described in detail below.

Typically, a home entertainment system outputs audio and video signals on a real time basis as users normally do not operate the system unless, for example, they wish to hear music or watch a movie at that time. For real time play, users have to load the sources, CDs or DVDs, on the player whenever they want to enjoy them. Jukeboxes are available to physically aggregate many music sources (CDs or LPs) and DVDs in one place for a user to select desired media.

However, another method for aggregating audio and video media is to store them in a mass storage device like a hard disk, a flash memory, or any other possible mass storage device. Here, mass storage device 501 can be a storage device contained in a box, like a hard disk in a PC, an external device, or the Internet. It is not limited thereto and any future development of mass storage device as well as their equivalents can be used. Mass storage device 501 can be connected through any suitable communication method, such as the Internet, USB, or Firewire, for example.

Other home entertainment system components provide storage of audio and video media, such as Tivo® for video or the Bose Lifestyle® system for audio. However, they do not provide the audiovisual enhancement achieved by the present invention through functional decomposition of the components.

More importantly, according to one embodiment of the present invention, ample supplemental information regarding the media stored in mass storage device 501 can be collected through either an on-line or off-line analysis of such media. An example of how such supplemental information can be used will now be described.

For example, storage device 501 may contain a string concerto media file. Processor 107, using information gathering software, for example, can perform off-line analysis of the string concerto stored in the hard disk. In other words, the computer can analyze the audio source, when the music is not played, and can tag the string music as a high frequency audio source, the vocals as a mid frequency audio source, and the percussion as a low frequency audio source. This analysis can be performed by main processor 107 or other information gathering system 515 in conjunction with archiving system 510 while the music is not played. Once the musical characteristics are identified, they can be stored on database 503 and retrieved by information fetching system 520 to adjust the output signals in order to accommodate such characteristics. For example, to emphasize a violin's high frequency sound, the processor may automatically adjust the crossover for the high frequency range from 2 KHz to 1.7 KHz based on the off-line analysis. This may produce much better sound by increasing the tweeter range for a violin. Typical home entertainment systems using mass storage devices cannot provide such automatic control features. Generally, if a listener wants to change the crossover frequency from 2 KHz to 1.5 KHz, he has to manually adjust an expensive digital crossover network in order to make such changes. Such manipulations require human intervention and rely on the judgment of the listener.

However, in an embodiment of the present invention, the computer can analyze the music by analyzing the sound waves or the combination of the digital codes. The system can determine that a string concerto generates a lot of high frequency sound and can adjust the crossover network that might be optimal to the particular listening environment.

Moreover, system 100 can analyze the listening room environment. An input device 105, which may be a microphone, is provided that may monitor the sound that the system produces, and depending on the listening room's sound reflection or absorption, the input device may give feedback to the system. Based on this feedback, the processor can make changes to compensate for the listening environment's characteristics. For example, in certain room structures, the bass frequency may be disproportionately absorbed. In such a case, the processor can increase the bass output in order to compensate for the absorbed bass sound. On the other hand, if the high frequency sound generates too much reflection, then the processor may reduce the high frequency output in order to achieve an optimal listening experience.

The audio characteristics can also be dynamically adjusted based on other factors of the listening environment. For example, adjustments can be made based on the positions of the speakers to one another. Therefore, if input device 105 detects that a left front speaker is further away than the right front speaker, an adjustment can be made to balance the sound by increasing the left front speaker volume. Adjustments can also be made based on the position of the listener in the room. Thus, for example, if a listener is in the back of the room, the rear speaker volume may be lowered, while the front speaker volume is increased. Adjustments can be made further for the size of the listening audience. In these cases, the input device may be a camera.

The same adjustment feature may be used to adjust a video output. TV programs can be recorded on mass storage device 501 just like the Tivo® or any other DVR. By reviewing the stored program before the viewer watches it, the processor can detect the commercials portion and then can skip or delete them accordingly. On the other hand, based upon that commercial information, a user can contact the vendors to purchase such products that show up in the commercials. Therefore, the present invention may take advantage of the mass storage by generating additional source information by processing them off-line.

Furthermore, video clips can be analyzed off-line and be easily used for later purposes. For example, a user can have the stored video media analyzed to find a scene showing a banana. Another user can have the media analyzed to find a scene with more than 10 people. By analyzing the video sources, people can gather certain types of images such as, for example, landscapes, sunrises, sunsets, skyscrapers, human faces, snow falls, and ocean views. Once the system analyzes the stored video media and tags the scenes while the system is not being used (i.e., off line), the tagged scenes can be found very easily. This might be really useful in video editing, organizing digital photo albums, and for other image related applications.

Also, based on the information generated by the off-line processing of the video media, the video output signals may be adjusted to provide an optimal viewing experience in a similar manner as the audio is adjusted to provide an optimal listening experience. For example, if the video signals are going to output a long sequence of blue ocean scenery, the invention may adjust a certain aspect of the video signal to be optimal for the attached video display, or based on the viewing environment, such as ambient light. The system may also adjust image characteristics like color intensity and luminescence based on the distance the viewer is from the display. The system may "learn" the optimal characteristics for different types of images and store such data in mass storage device 501.

In other words, the combination of a mass storage with a powerful centralized integrates audio video processor can provide off-line processing of the stored audio and video media that generates supplemental information, which may later be used to enhance the users' overall listening and viewing experience. In addition, because of the central control provided, audio or video connoisseurs may choose to manipulate the audio and video signals manually and database 503 on mass storage device 501 can be used to store their preferred settings for specific types of media and different user profiles can also be stored to further personalize the system.

As a result, users can store media content on mass storage device 501 and information gathering system 515 analyzes the mass storage device's contents and constructs a database of the contents' characteristics. Information fetching system 520 uses the collected characteristic information of the contents, i.e., the supplemental information, and adjusts the parameters of the system. For example, information fetching system 520 may adjust the volume, filter, and crossover control for audio signals and may control scaling and color enhancing for video signals. With this embodiment, a user may be freed from the annoyance of controlling the listening or viewing conditions whenever the media content being played changes.

Figure 13:
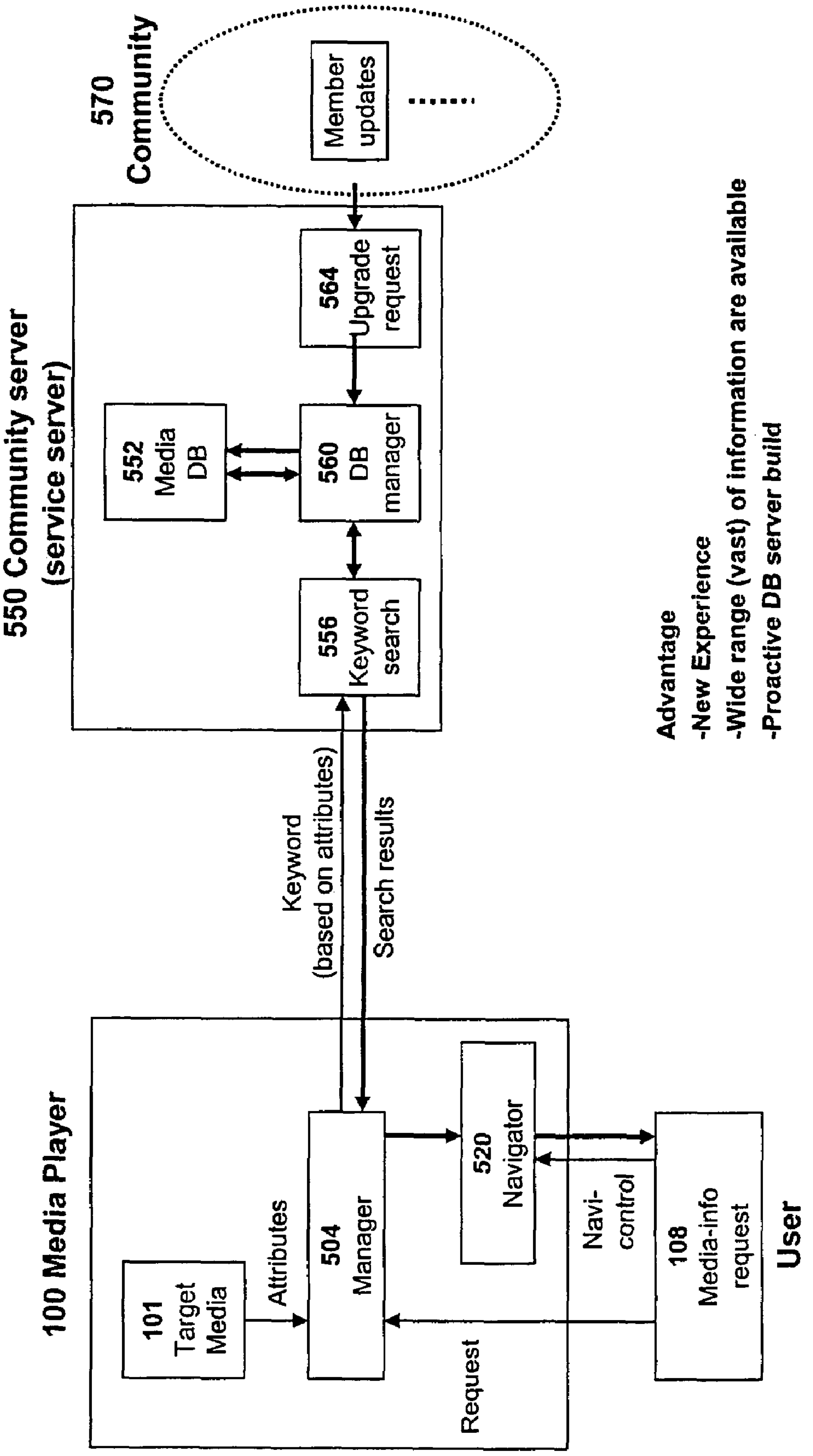
FIG. 13 shows a schematic block diagram for a media-database file sharing system according to an embodiment of the present invention.

Referring to FIG. 13, this supplemental information, as well as personalized settings or profiles, can be shared over the Internet. This may save users from trying the trial and error method for determining the best audiovisual settings because these settings can be shared among users of the system. Such information can be generated and put in a central database to be sold or this information could be just shared among the users in a cyber community database.

Because the invention contemplates the use of a PC architecture, the system has the flexibility of using any suitable device for providing connectivity to the Internet such as, for example, an ethernet connection, wireless 802.11a/b/g connection, a digital subscriber line modem, or cable modem, or regular telephone modem. The software modules may also be delivered over this connection. Moreover, personalized media like movies, TV programs, or music can also be delivered to the system over the connection. Such media may be delivered at the request of the user or could be offered automatically based on the user preferences determined by main processor 107 in evaluating the content stored on mass storage device 501 or media that has otherwise been viewed or listened to.

In the media-database sharing system of FIG. 13, the media system 100 may also include target source 101, a manager 504, which may be included on database 503, and a navigator 521, which may also be incorporated into information fetching system 520. Manager 504 is in communication with a community server 550 that includes: a media database 552, a keyword search module 556, a database manager 560. Community server may also include an update request module for accessing media information stored on the databases of other users in community 570 or media information from a central provider. Manager 504 obtains media characteristics from target media source 101 based on user input 108. Navigator 521 can retrieve such information from the manager to make adjustments to an output signal based on user input 108.

In addition, manager 504 can query community server 550 for media information. Keyword search module 556 processes the request from manager 504. The request from manager 504 may be as a result of direct user input 108 or an automated request to provide the ideal characteristics for a given type of media. Database manager 560 searches media database 552 for information on the target media. Using update request module 564, database manager may also query the community 570, which can be other connected users or a centralized provider, for information on target media source 101. Database manager 560 will update media database 552 based on information received in response to a community query. Search results will be sent back to manager 504 and may be used to adjust audio output in the manner described above. Community server 550 can query manager 504 for media information in database 503 to provide such information other users in community 570 as well.

Archiving system 510 can organize retrieved data as well as stored data in a number of ways. Preferably, media and display and listening parameters are organized by the types of media, such as format or the type of program. For example, media can be grouped by the optimal display resolution because it is likely that their optimal display characteristics will be similar. Media could also be grouped by genre so that users will be able to find the media they are in the "mood" for. For example, movies could be categorized into comedy, drama, horror, action, and science-fiction, just to name a few. Likewise, music could also be categorized in such a manner like jazz, classical, R&B, big-band, and Top 40, among others. Users could also have profiles that set categories based upon their own preferences.

Actual media containing parameters for optimizing its display or providing an optimal listening experience can also be provided by the community server like a pay-per-view or on-demand system. A content provider can provide a copy protection mechanism with such media or the parameters themselves to limit the use of the media and/or parameters only to the system to which such data was delivered over the network connection. Such copy protection techniques may include: limiting the number of times the media can be used, limiting the time the media is available for use, embedding a code in the media that is unique to a particular system, or other techniques that are well known to persons having ordinary skill in the art.

Because of the flexible architecture of the integrated system of the invention, the user interface to retrieve media from a community server can take many different forms. A web-based interface can be provided where the user can select media having optimal display or listening parameters most suitable for a user's taste. For instance, when selecting a horror movie having darker display characteristics, the user may select parameters providing a "brighter" version of such a movie consistent with that user's tastes. In addition, that same user can select audio characteristics consistent with their tastes. In the horror movie example, the user may decide to choose a high-bass audio track to make the movie more suspenseful. Similar choice can be offered for audio media using such a user interface.

Users of this embodiment of the present invention may upload their supplemental information to a server or may download other supplemental information generated by others from the server. Users also may exchange their information among themselves without using a server like in a peer-to-peer network, for example. Users may now find information more easily and conveniently that may be necessary for either proper operation of their system or for creating the exact environment to meet their tastes.

Moreover, other Internet functionality can also be provided such as voice over Internet protocol (VoIP) telephone service, teleconferencing, video conferencing, e-mail, file sharing, Internet browsing, and Internet messaging, for example. Moreover, the flexible PC architecture permits the system to function as a PC, and could operate computer programs like productivity applications like word processing, spreadsheets, and presentation software, just to name a few.

The PC architecture plus improved audiovisual capability makes the system of the present invention suitable as a game console as well. Software emulation may be used to mimic other game systems or a proprietary system could be developed. Moreover, if an Internet connection is present, a system may permit network gaming that has become extremely popular, such as the X-Box® Live or EA Sports™ Online. This service could be provided in a similar manner as the cyber community for sharing system control settings information described above. The Internet also could be used to deliver game content to the system in a similar manner as audio and video media.

While the present invention has been described in detail above with reference to specific embodiments, those skilled in the art will appreciate that various modifications and substitutions can be made thereto without departing from the spirit and scope of the present invention as defined in the appended claims.

What is claimed is:

1. A method for controlling audio signals, comprising:

receiving audio signals;

acquiring information on sound reception from an image capture device;

separating the audio signals into a plurality of frequency ranges;

adjusting endpoints of the frequency ranges dynamically;

checking reference data for each of the frequency ranges;

adjusting the audio signal in each frequency range of the plurality of frequency ranges based on the reference data and the information on sound reception; and synthesizing the adjusted audio signal in each frequency range of the plurality of frequency ranges for further processing to generate audio output, wherein the information on sound reception is a position of a sound receptor in relation to a sound source, and wherein the reference data corresponds to the sound source's reproduction characteristics based on the position of the sound receptor in relation to the sound source.

2. The method of claim 1, wherein the reference data corresponds to a sound pressure level for each of the frequency ranges.

3. The method of claim 2, wherein the sound pressure level corresponds to an angle between the sound receptor and the sound source.

4. The method of claim 2, wherein the sound pressure level corresponds to a distance between the sound receptor and the sound source.

5. The method of claim 1, wherein the sound receptor is human being.

6. The method of claim 1, wherein the sound source is a speaker unit.

* * * * *